(12) United States Patent
Smith et al.

(10) Patent No.: US 11,915,687 B1
(45) Date of Patent: *Feb. 27, 2024

(54) SYSTEMS AND METHODS FOR GENERATING LABELED DATA TO FACILITATE CONFIGURATION OF NETWORK MICROPHONE DEVICES

(71) Applicant: Sonos, Inc., Santa Barbara, CA (US)

(72) Inventors: Connor Kristopher Smith, New Hudson, MI (US); Kurt Thomas Soto, Ventura, CA (US); Charles Conor Sleith, Waltham, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,096

(22) Filed: Jan. 9, 2023

Related U.S. Application Data

(63) Continuation of application No. 17/031,769, filed on Sep. 24, 2020, now Pat. No. 11,551,670.

(60) Provisional application No. 62/906,553, filed on Sep. 26, 2019.

(51) Int. Cl.
| | |
|---|---|
| *G10L 15/06* | (2013.01) |
| *G10L 15/14* | (2006.01) |
| *G10L 15/22* | (2006.01) |
| *G10L 15/16* | (2006.01) |

(52) U.S. Cl.
CPC ............ *G10L 15/148* (2013.01); *G10L 15/16* (2013.01); *G10L 15/22* (2013.01); *G10L 2015/223* (2013.01)

(58) Field of Classification Search
CPC ......... G10L 15/06; G10L 15/00; G10L 15/01; G10L 15/063; G10L 15/065; G10L 15/08; G10L 15/14; G10L 15/146; G10L 15/16; G10L 15/20; G10L 15/22; G10L 15/26; G10L 15/28; G10L 2015/0631–0638; G10L 2015/221–228
USPC ............ 704/244, 231, 232, 243, 255, 256.3, 704/256.7

See application file for complete search history.

(56) References Cited

U.S. PATENT DOCUMENTS

| | | | |
|---|---|---|---|
| 8,234,395 B2 | 7/2012 | Millington | |
| 8,483,853 B1 | 7/2013 | Lambourne | |
| 8,965,033 B2 | 2/2015 | Wiggins | |
| 9,084,058 B2 | 7/2015 | Reilly et al. | |
| 9,824,150 B2 * | 11/2017 | Hoarty | G06F 40/211 |
| 10,339,470 B1 * | 7/2019 | Dutta | G06N 20/20 |

(Continued)

*Primary Examiner* — Qi Han
(74) *Attorney, Agent, or Firm* — FINCH & MALONEY PLLC

(57) ABSTRACT

Systems and methods for generating training data are described herein. Pieces of metadata captured by a plurality of networked sensor systems can be captured, where each piece of metadata is associated with a specific set of sensor data captured by one of the plurality of networked sensor systems and includes a set of characteristics for the specific set of captured sensor data. A probabilistic model can be generated based on the received metadata and simulations can be performed based upon a training corpus by generating multiple scenarios, and, for each scenario, a scenario specific version of a particular annotated sample is generated by performing a simulation using the particular annotated sample. The scenario specific versions of annotated samples from the training corpus can be stored as a training data set on the at least one network device.

24 Claims, 13 Drawing Sheets

(56) References Cited

U.S. PATENT DOCUMENTS

| | | |
|---|---|---|
| 11,551,670 B1 | 1/2023 | Smith et al. |
| 2009/0043573 A1* | 2/2009 | Weinberg ................ G10L 17/06 |
| | | 704/223 |
| 2017/0242653 A1 | 8/2017 | Lang et al. |
| 2017/0243576 A1* | 8/2017 | Millington .............. G10L 15/30 |
| 2017/0337478 A1* | 11/2017 | Sarikaya ................ G06F 40/35 |
| 2019/0341052 A1* | 11/2019 | Allibhai ................ G06N 3/045 |

* cited by examiner

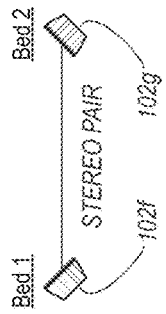
*Figure 3B*
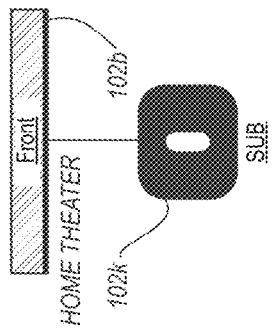
*Figure 3C*
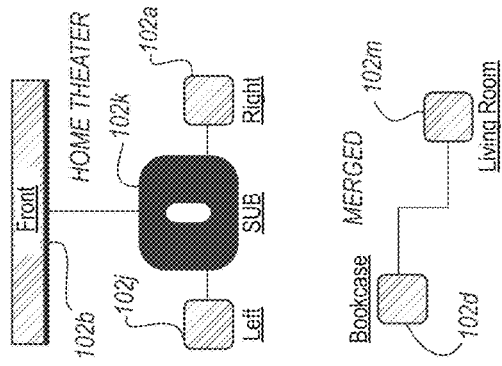
*Figure 3D*
*Figure 3E*
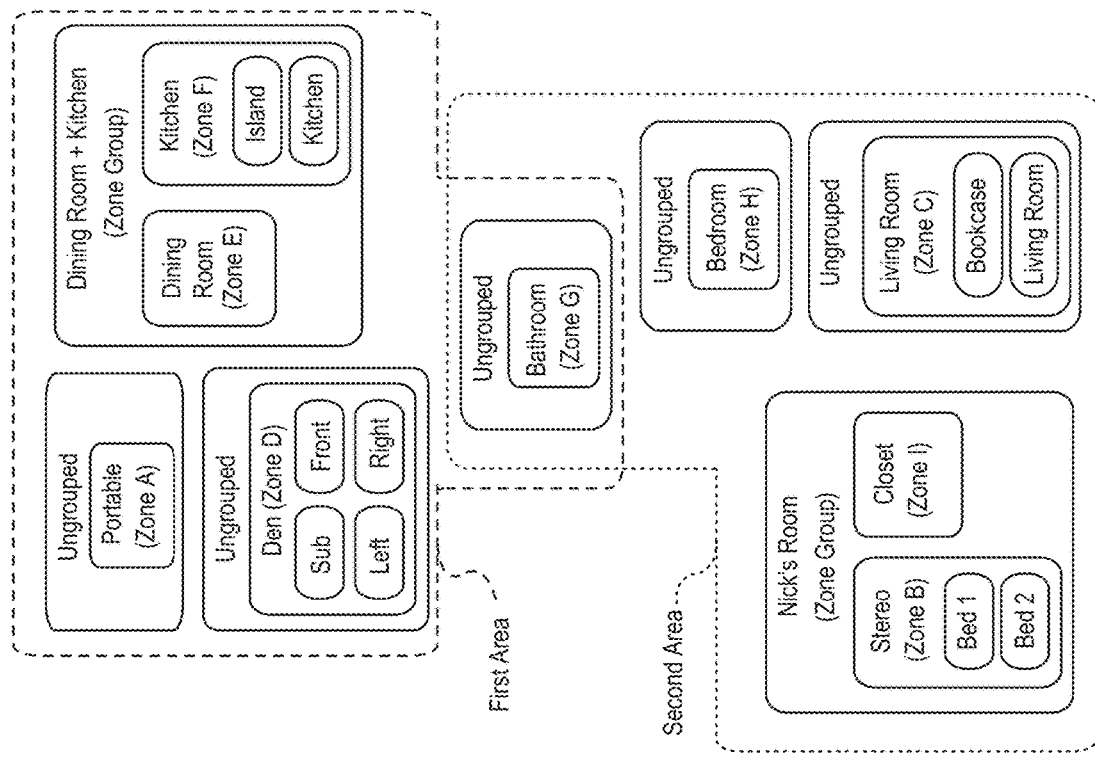
*Figure 3A*

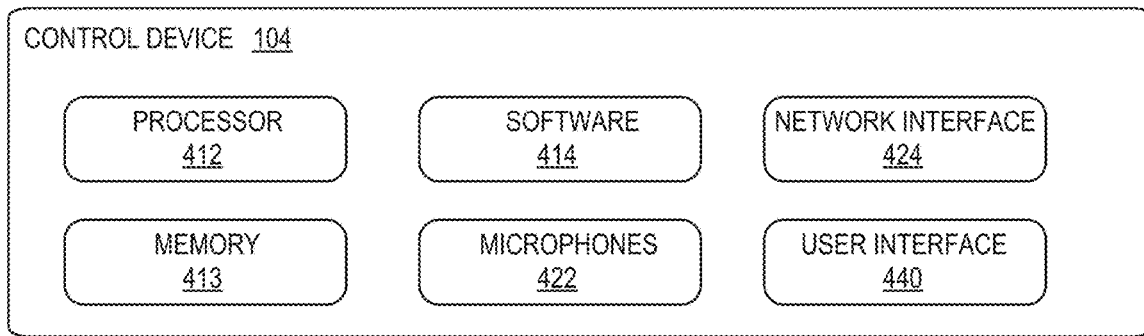
*Figure 4A*
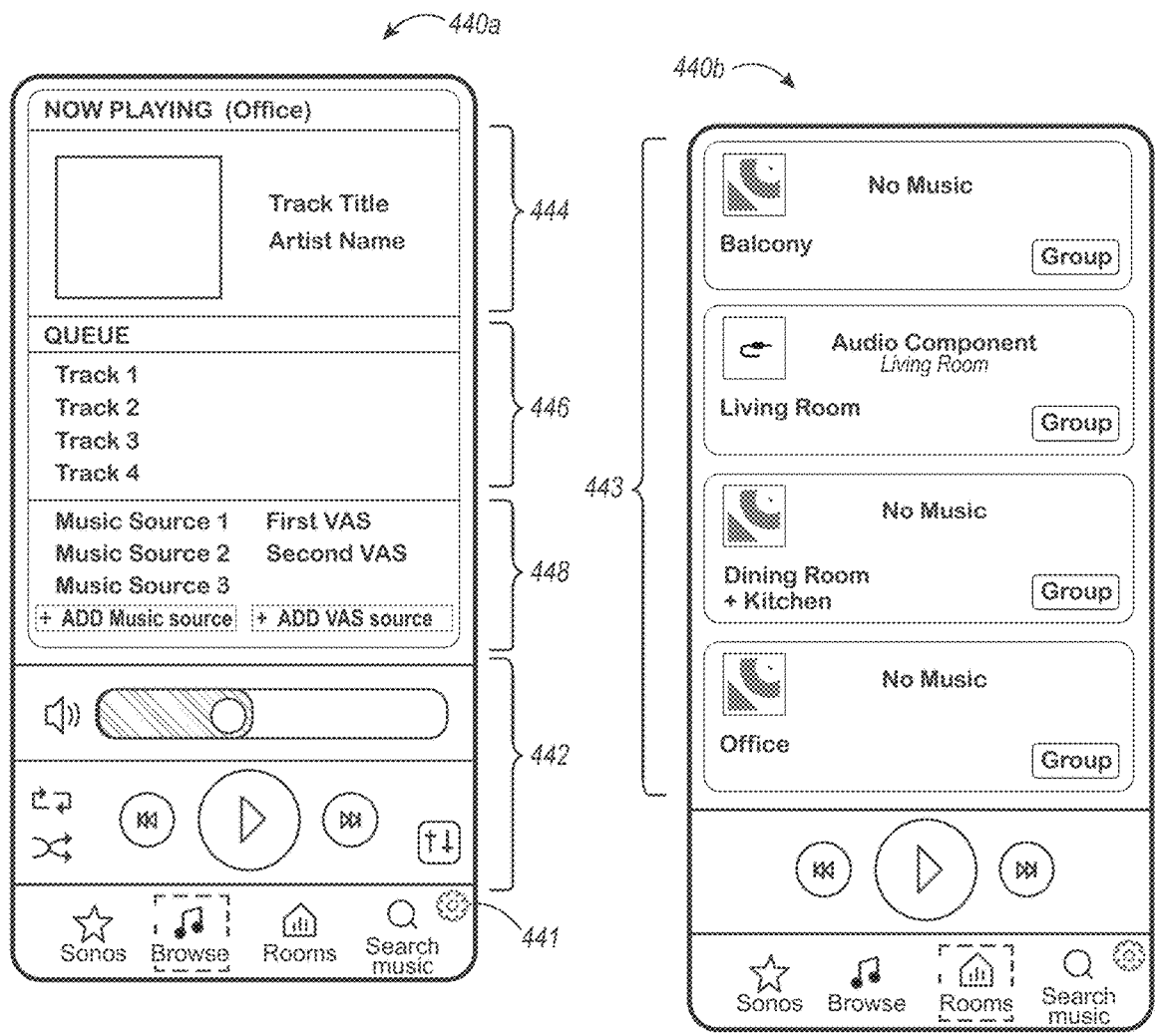
*Figure 4B*
*Figure 4C*

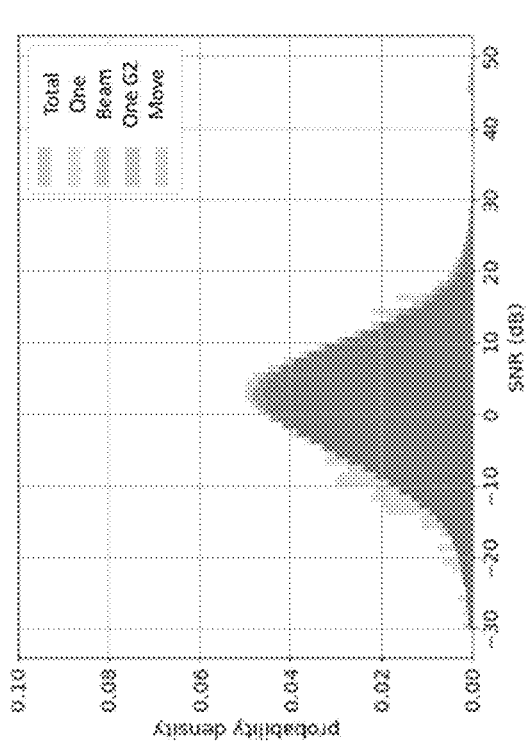
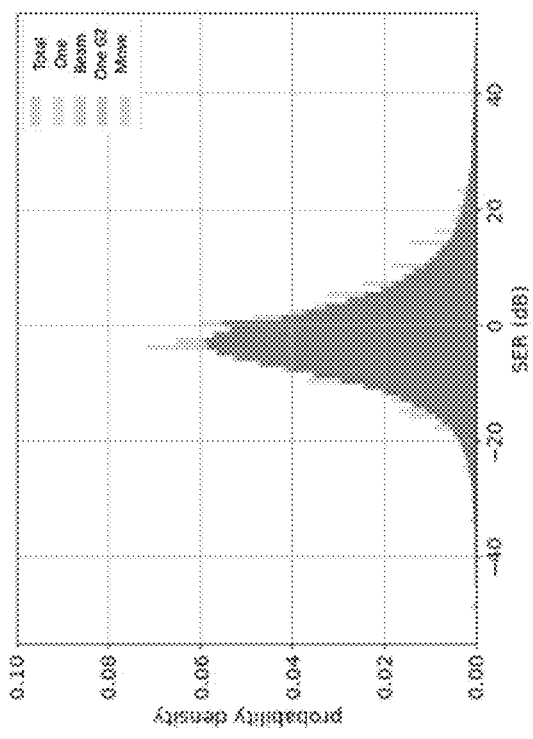
FIG. 8

SYSTEMS AND METHODS FOR GENERATING LABELED DATA TO FACILITATE CONFIGURATION OF NETWORK MICROPHONE DEVICES

CROSS-REFERENCE TO RELATED APPLICATIONS

This application is a continuation of U.S. patent application Ser. No. 17/031,769, filed on Sep. 24, 2020, titled "SYSTEMS AND METHODS FOR GENERATING LABELED DATA TO FACILITATE CONFIGURATION OF NETWORK MICROPHONE DEVICES," which claims priority to U.S. Provisional Patent Application No. 62/906,553, filed on Sep. 26, 2019, titled "SYSTEMS AND METHODS FOR GENERATING LABELED DATA," which is incorporated herein by reference in its entirety.

TECHNICAL FIELD

The present technology relates to generating labeled training data and, more particularly, to methods, systems, products, features, services, and other elements directed to generating diverse and realistic labeled training data or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

SUMMARY

Systems and methods for generating training data in accordance with various embodiments are illustrated. One embodiment includes a method for updating software configuration parameters of at least one network microphone device (NMD). The method includes steps for capturing multiple sets of sound data using network microphone devices (NMDs), where each of the NMDs is configured in accordance with a set of NMD software configuration parameters. For each captured set of sound data, the method includes steps for capturing sound metadata associated with a specific set of sound data, where each piece of sound metadata includes a set of characteristics for a set of sound data. The method further includes steps for receiving sound metadata captured by the NMDs using at least one network device and generating a probabilistic model based on the received sound metadata using the at least one network device, where the probabilistic model includes probability distribution functions (PDF) for each characteristic from the set of characteristics. The method includes steps for performing acoustic simulations to obtain noised versions of a training data set of annotated speech samples using the at least one network device by generating several scenarios, where each scenario includes a set of characteristics for a set of sound data and the values for the characteristics in the set of characteristics for the scenario are drawn from the probabilistic model, and for each of the several scenarios, generating a noised version of a specific annotated speech sample by performing an acoustic simulation based upon a specific scenario from the scenarios. The method includes steps for simulating performance of a set of modified NMD software configuration parameters at the at least one network device using the noised version of the training data set of annotated speech samples, sending modified NMD software configuration parameters to at least one NMD, and updating the software of the at least one NMD based upon the modified NMD software configuration parameters.

In a further embodiment, the set of characteristics includes at least one of frequency response data for individual microphones of several microphones of the NMD, an echo return loss enhancement measure, a voice direction measure, signal and noise estimates, and speech spectral data.

In still another embodiment, receiving sound metadata includes deriving derived metadata from the received sound metadata.

In a still further embodiment, receiving sound metadata includes receiving contextual data, where the contextual data includes at least one of environmental data that describes an environment of the NMD and user data that describes a user associated with the NMD.

In yet another embodiment, at least one PDF describes a joint distribution for at least two characteristics from the set of characteristics.

In a yet further embodiment, each annotated speech sample is annotated with at least one of spoken text and speaker characteristics.

In another additional embodiment, the software configuration parameters include at least one of a playback volume level, gain level, a noise-reduction parameter, and a wake-word-detection sensitivity parameter.

In a further additional embodiment, performing the acoustic simulation includes generating a virtual room model based on a given scenario.

In another embodiment again, captured sound data cannot be reconstructed from the captured sound metadata.

One embodiment includes a method for generating training data for a machine learning process. The method includes steps for receiving pieces of metadata captured by networked sensor systems using at least one network device, where each piece of metadata is associated with a specific set of sensor data captured by one of the networked sensor systems and includes a set of characteristics for the specific set of captured sensor data. The method includes steps for generating a probabilistic model based on the received metadata using the at least one network device, where the probabilistic model includes at least one probability distribution function (PDF) for a characteristic from the set of characteristics. The method includes steps for performing multiple simulations using the at least one network device based upon a training corpus by generating several scenarios, where each scenario includes a set of characteristics for a set of sensor data and the values for the characteristics in the set of characteristics for the scenario are drawn from the probabilistic model, and for each of the several scenarios, generating a scenario specific version of a particular annotated sample from the training corpus by performing a simulation using the particular annotated sample based upon a selected scenario from the several scenarios. The method includes steps for storing the scenario specific versions of annotated samples from the training corpus as a training data set on the at least one network device.

In a further embodiment again, the method further includes steps for providing the scenario specific versions of annotated samples to a test element, evaluating the performance of the test element based on annotations of the scenario specific versions of annotated samples, and modifying the test element based on the evaluated performance.

In still yet another embodiment, the test element is a network microphone device (NMD).

In a still yet further embodiment, the test element is a machine learning model, where modifying the machine learning model includes training the machine learning model to detect the presence of wake words in the scenario specific versions of annotated samples.

In still another additional embodiment, the networked sensor systems includes a set of one or more network microphone devices (NMDs), each NMD includes multiple microphones, each microphone captures audio data, and pieces of metadata from a NMD are associated with the captured audio data.

In a still further additional embodiment, the audio data includes at least one of raw audio data and speech spectra.

In still another embodiment again, the pieces of metadata include derived data that is derived from the audio data.

In a still further embodiment again, the derived data includes at least one of signal-noise ratio, frequency response data, echo return loss enhancement measures, voice direction, and arbitration statistics.

In yet another additional embodiment, the test element is an audio analysis process operating on a second NMD, where the method further includes distributing a modified audio analysis process to multiple NMDs of the networked sensor systems.

In a yet further additional embodiment, the pieces of metadata include environmental data that describes an environment of the NMD.

In yet another embodiment again, the probabilistic model includes a PDF for each of several characteristics, where a first PDF for a first characteristic is a conditional distribution based on a value drawn from a second PDF for a second characteristic of the characteristics.

In a yet further embodiment again, performing a simulation includes generating a virtual room model based on a scenario of the set of scenarios.

In another additional embodiment again, the networked sensor systems include at least one of an accelerometer, a radio frequency sensor, and a camera.

One embodiment includes a method for generating noised training data for a machine learning process. The method includes steps for receiving pieces of audio metadata captured by the network microphone devices (NMDs) using at least one network device, where each piece of audio metadata is associated with a specific set of sound data captured by one of the NMDs and includes a set of characteristics for the specific set of sound data, generating a probabilistic model based on the received audio metadata using the at least one network device, where the probabilistic model includes at least one probability distribution function (PDF) for a characteristic from the set of characteristics, performing a several acoustic simulations using the at least one network device based upon a training data set of annotated speech samples by generating several scenarios, where each scenario includes a set of characteristics for a set of sound data and the values for the characteristics in the set of characteristics for the scenario are drawn from the probabilistic model, and for each of the several scenarios, generating a noised version of a specific annotated speech sample by performing an acoustic simulation using the specific annotated speech sample based upon a selected scenario from the several scenarios, and storing the noised versions of annotated speech samples as a noised training data set on the at least one network device.

Additional embodiments and features are set forth in part in the description that follows, and in part will become apparent to those skilled in the art upon examination of the specification or may be learned by the practice of the technology described herein. A further understanding of the nature and advantages of the technology described herein may be realized by reference to the remaining portions of the specification and the drawings, which forms a part of this disclosure.

BRIEF DESCRIPTION OF THE DRAWINGS

Features, aspects, and advantages of the presently disclosed technology may be better understood with regard to the following description, appended claims, and accompanying drawings.

FIG. 2A.

FIG. 4A is a functional block diagram of an example controller device in accordance with aspects of the disclosure.

FIGS. 4B and 4C are controller interfaces in accordance with aspects of the disclosure.

FIG. 8 illustrates examples of distributions of metadata characteristics.

Figure 1A:
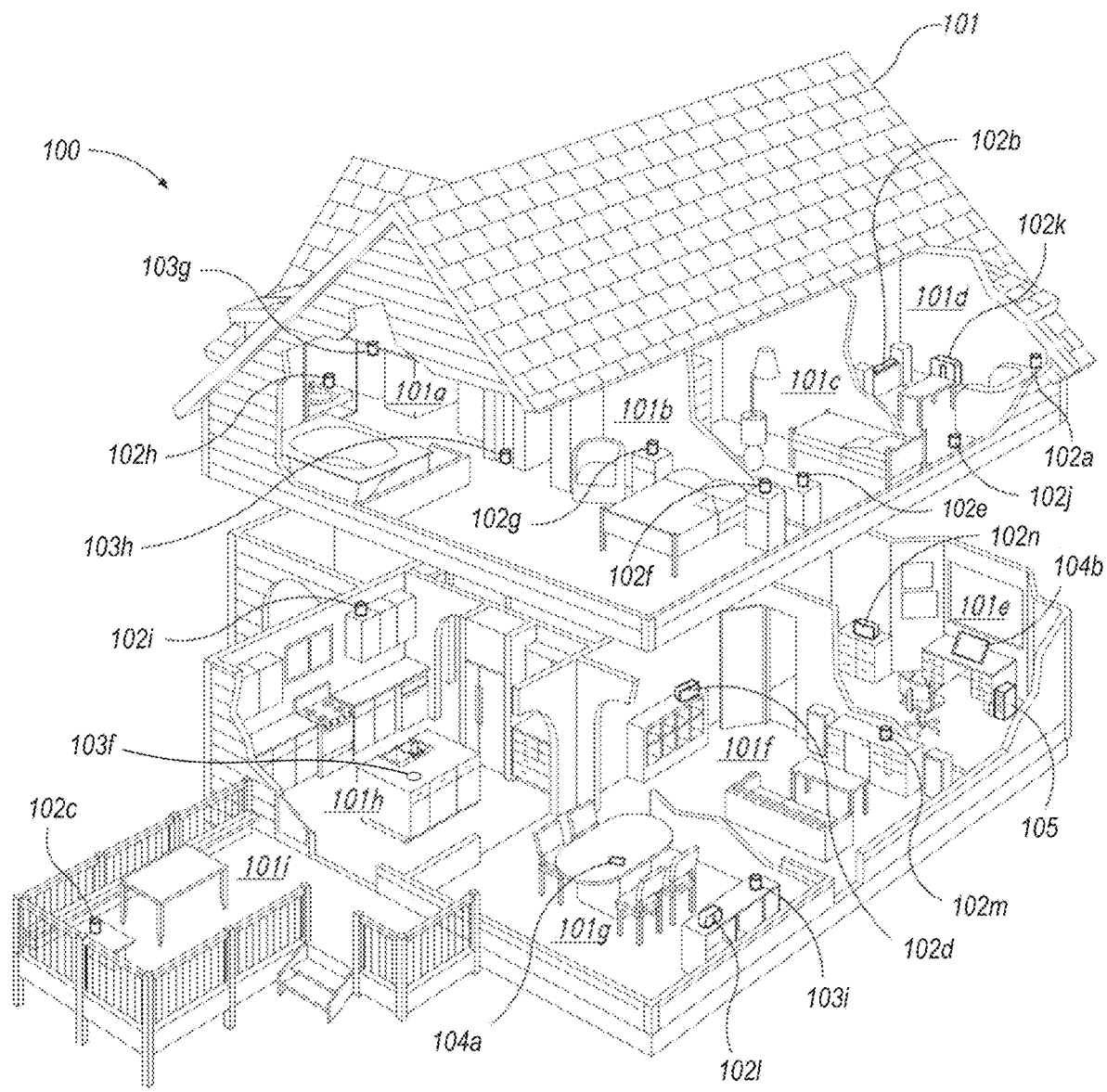
FIG. 1A is a partial cutaway view of an environment having a media playback system configured in accordance with aspects of the disclosed technology.

The drawings are for purposes of illustrating example embodiments, but it should be understood that these embodiments are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

In various fields, such as voice recognition, it is becoming increasingly desirable to use machine learning (ML) models to recognize and/or process recorded speech. However, ML models can often require a significant amount of diverse data to train, test, and validate, especially when training models to be robust to various different situations (e.g., noisy environments, microphone placements, accents, speech patterns, etc.). In some cases, real-world samples can be desirable for other processes, including testing the performance of various devices and/or processes, such as (but not limited to) wake-word processes, digital signal processing, microphone arrays, prototype devices, etc.

The quality and quantity of such training/testing data can directly impact the performance of the ML model. It is desirable to have a vast number of samples that can accurately reflect real-world situations. This has sparked an interest in gathering as many real-world samples as possible, but gathering a large number of diverse and realistic samples can often be time-consuming, expensive, and/or simply impractical.

Conventional methods often attempt to grow training data sets using data augmentation and other generative processes to generate new training data from existing training data. However, such methods can often result in training data that lacks diversity and/or fails to accurately reflect the "real-world" (e.g., unrealistic distributions of characteristics). In many cases where training data is generated using a model, training data can be populated with unrealistic generated samples that can skew the training of any model based on such training data. In contrast to these conventional methods, some embodiments of the technology described herein may be employed to advantageously generate diverse, realistic, and representative training data by simulating "noisy" samples (or samples with various characteristics) from clean samples based on distributions of the characteristics in real-world data. As a result, the training data created in accordance with the techniques described herein is of considerably higher value (e.g., for training and/or validating ML models) relative to training data created using conventional approaches.

In some cases, the collection and processing of real-world samples can create privacy concerns and can require significant data resources (e.g., bandwidth, storage, etc.). For example, consumers may not want a company to store audio recordings of their voice (e.g., captured using a voice-enabled smart speaker) and/or video recordings of their home (e.g., captured via a smart security camera). However, conventional techniques for augmenting training data may rely upon having direct and complete access to such real-world samples. For example, conventional techniques for augmenting training data for a speech processing model rely upon direct access to raw recordings of human speech. In contrast to these conventional approaches, some embodiments of the technology described herein can generate new training data from lower-dimensional representations (e.g., metadata) of real-world data, without directly collecting real-world data. For example, some dimensionality of real-world data may be discarded in order to enhance user privacy and/or to reduce the data requirements when compared to those required for real-world samples. In turn, the lower-dimensional representation of the real-world data may be employed to generate the high-quality training data. As a result, real-world data containing sensitive information does not need to be stored and/or transmitted to a remote device (e.g., a cloud server) in order to generate high-quality training data in accordance with some embodiments described herein.

Systems and methods in accordance with numerous embodiments can be used to generate diverse and realistic audio samples based on metadata gathered from "real-world" audio samples. Insights gained regarding real-world voice interactions from metadata can be leveraged to identify common real-world scenarios. In many embodiments, processes can perform acoustic simulations on "clean" audio samples based on real-world scenarios to combine noise and speech data to generate noised audio samples that simulate these real-world scenarios. In a number of embodiments, this noised speech can be used to train machine learning models and/or employed as test data to analyze the performance of network microphone devices.

Although many of the examples described herein refer to applications in audio and/or speech data, one skilled in the art will recognize that similar systems and methods can be used in a variety of applications to simulate sample data from various types of sensors, including (but not limited to) image data, video data, global positioning system (GPS) data, wireless signal data, health data, and/or motion data, without departing from the scope of the present disclosure.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves. In order to gain an appreciation for the various environments in which certain embodiments may capture audio samples from which metadata can be extracted, a discussion of exemplary operating environments is presented below.

II. Example Operating Environment

Figure 1B:
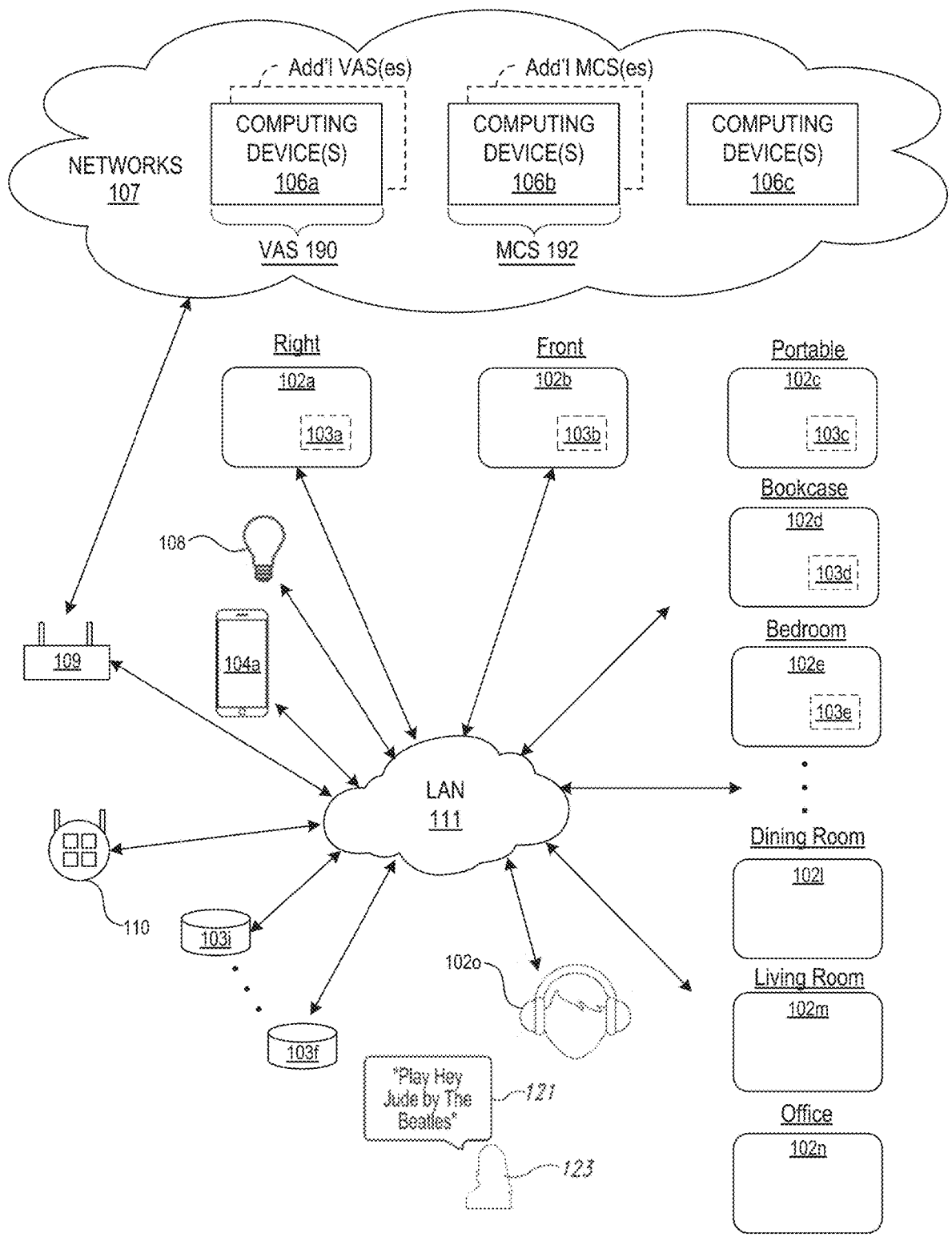
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a LAN 111 including a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the LAN 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a voice activated system ("VAS") and at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a—e include or are otherwise equipped with corresponding NMDs 103a—e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the named "Island" because it is physically situated on an island countertop in the Kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the LAN 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in U.S. Application Publication No. US-2017-0242653, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103f in the Kitchen 101h (FIG. 1A) may be assigned to the Dining Room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the LAN 111 (FIG. 1B) may be eliminated and the single playback device 102 and/or the single NMD 103 may communicate directly with the remote computing devices 106a—d. In some embodiments, a telecommunication network (e.g., an LTE network, a 5G network, etc.) may communicate with the various playback, network microphone, and/or controller devices 102-104 independent of a LAN.

While specific implementations of MPS's have been described above with respect to FIGS. 1A and 1B, there are numerous configurations of MPS's, including, but not limited to, those that do not interact with remote services, systems that do not include controllers, and/or any other configuration as appropriate to the requirements of a given application.

a. Example Playback & Network Microphone Devices

Figure 2A:
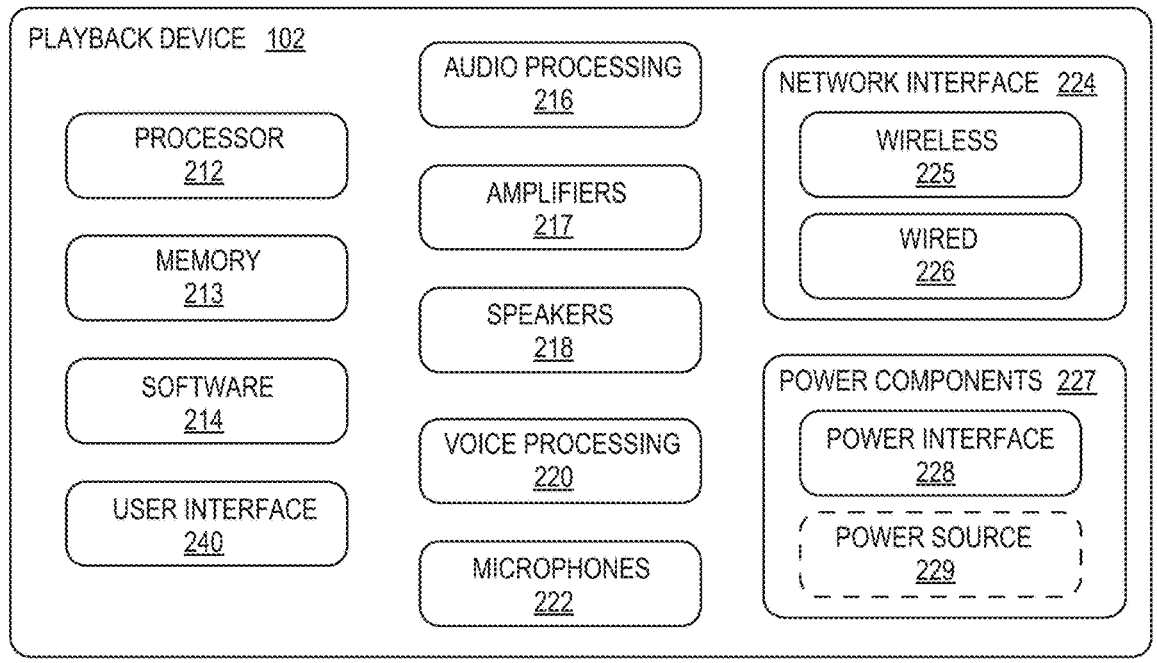
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audiovisual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A includes both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously-referenced U.S. patent application Ser. No. 15/438,749.

As further shown in FIG. 2A, the playback device 102 also includes power components 227. The power components 227 can include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 can further include a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
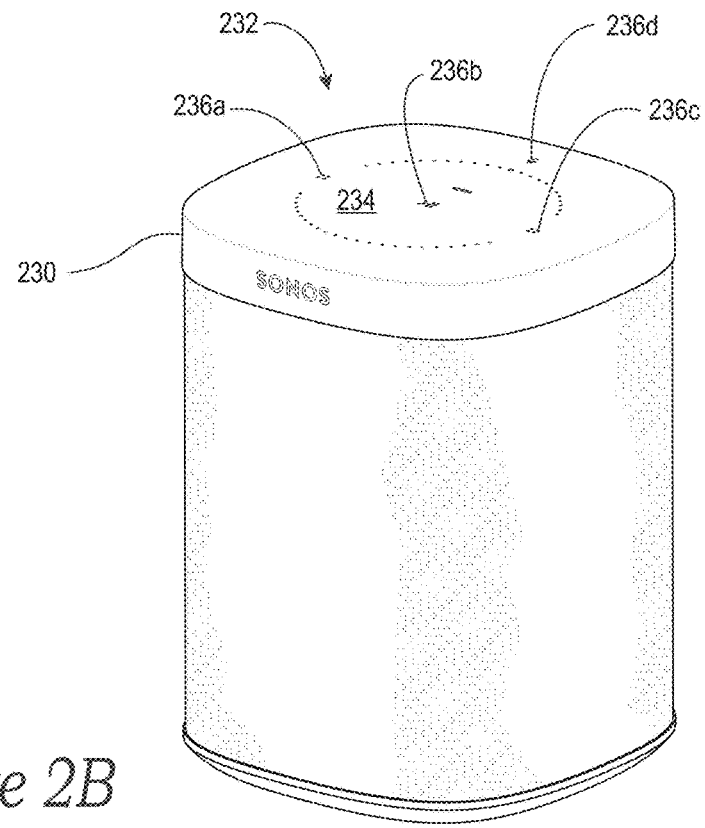
FIG. 2B is an isometric diagram of an example housing of the playback device of FIGS. 3A-3E are diagrams showing example playback device configurations in accordance with aspects of the disclosure.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

While specific implementations of playback and network microphone devices have been described above with respect to FIGS. 2A and 2B, there are numerous configurations of devices, including, but not limited to, those having no UI, microphones in different locations, multiple microphone arrays positioned in different arrangements, and/or any other configuration as appropriate to the requirements of a given application. For example, UIs and/or microphone arrays can be implemented in other playback devices and/or computing devices rather than those described herein. Further, although a specific example of playback device 102 is described with reference to MPS 100, one skilled in the art will recognize that playback devices as described herein can be used in a variety of different environments, including (but not limited to) environments with more and/or fewer elements, without departing from the scope of the present disclosure. Likewise, MPS's as described herein can be used with various different playback devices.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the media playback system 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102*f* in the master bedroom 101*h* (FIG. 1A) and the Bed 2 device may be the playback device 102*g* also in the master bedroom 101*h* (FIG. 1A).

As noted above, playback devices that are bonded may have different playback responsibilities, such as playback responsibilities for certain audio channels. For example, as shown in FIG. 3B, the Bed 1 and Bed 2 devices 102*f* and 102*g* may be bonded so as to produce or enhance a stereo effect of audio content. In this example, the Bed 1 playback device 102*f* may be configured to play a left channel audio component, while the Bed 2 playback device 102*g* may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102*b* named "Front" may be bonded with the playback device 102*k* named "SUB." The Front device 102*b* may render a range of mid to high frequencies, and the SUB device 102*k* may render low frequencies as, for example, a subwoofer. When unbonded, the Front device 102*b* may be configured to render a full range of frequencies. As another example, FIG. 3D shows the Front and SUB devices 102*b* and 102*k* further bonded with Right and Left playback devices 102*a* and 102*j*, respectively. In some implementations, the Right and Left devices 102*a* and 102*j* may form surround or "satellite" channels of a home theater system. The bonded playback devices 102*a*, 102*b*, 102*j*, and 102*k* may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102*d* and 102*m* in the Living Room merged, which would result in these devices being represented by the single UI entity of Zone C. In one embodiment, the playback devices 102*d* and 102*m* may playback audio in synchrony, during which each outputs the full range of audio content that each respective playback device 102*d* and 102*m* is capable of rendering.

In some embodiments, a stand-alone NMD may be in a zone by itself. For example, the NMD 103*h* from FIG. 1A is named "Closet" and forms Zone I in FIG. 3A. An NMD may also be bonded or merged with another device so as to form a zone. For example, the NMD device 103*f* named "Island" may be bonded with the playback device 102*i* Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone. For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4A is a functional block diagram illustrating certain aspects of a selected one of the controller devices 104 of the MPS 100 of FIG. 1A. Controller devices in accordance with several embodiments can be used in various systems, such as (but not limited to) an MPS as described in FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 can be configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4A, the controller device 104 can also include a user interface 440 that is generally configured to facilitate user access and control of the MPS 100. The user interface 440 may include a touch-screen display or other physical interface configured to provide various graphical controller interfaces, such as the controller interfaces 440a and 440b shown in FIGS. 4B and 4C. Referring to FIGS. 4B and 4C together, the controller interfaces 440a and 440b include a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

e. Example Network Microphone Devices

Figure 5:
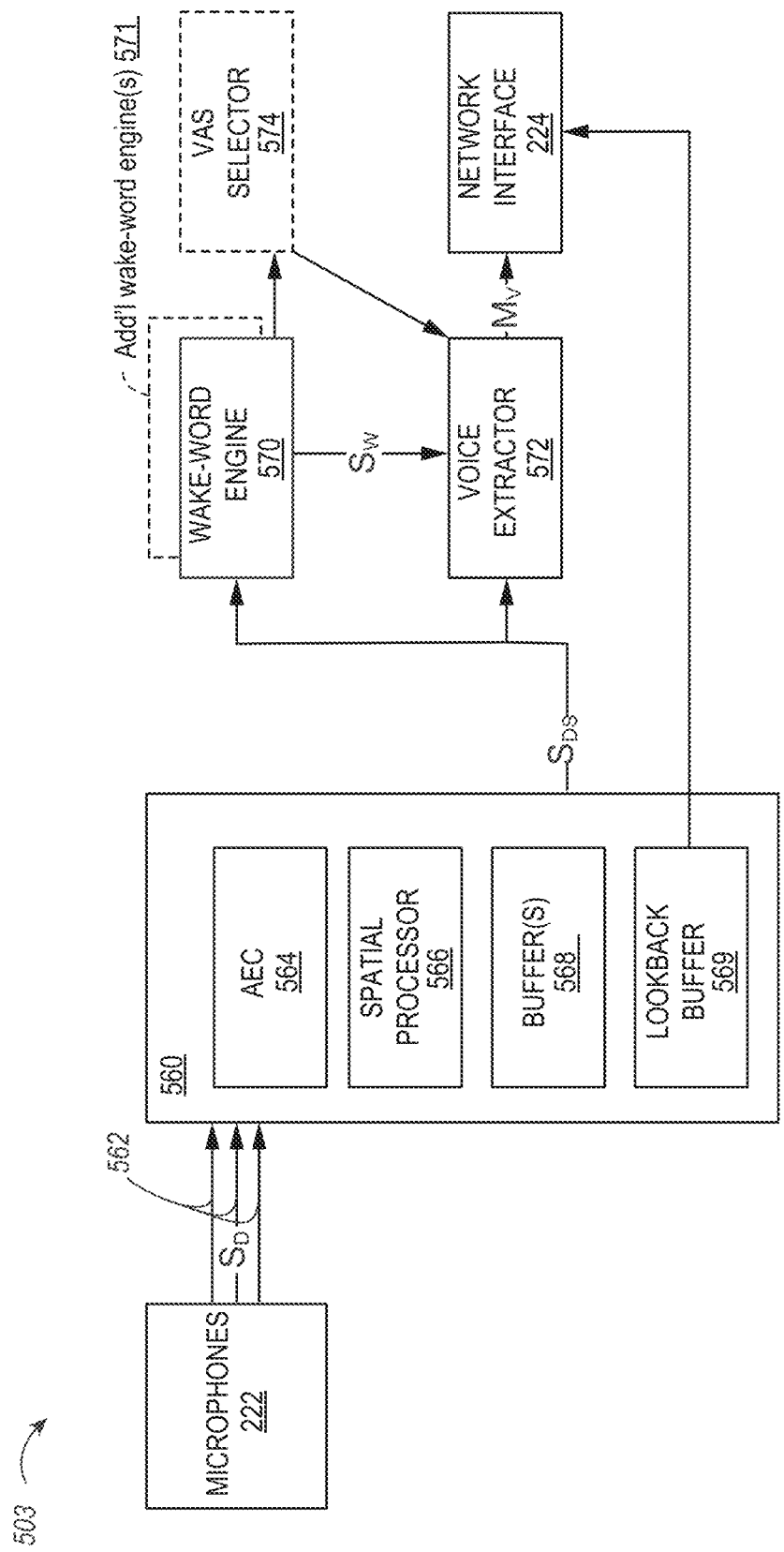
FIG. 5 is a functional block diagram of certain components of an example network microphone device in accordance with aspects of the disclosure.

FIG. 5 is a functional block diagram showing an NMD 503 configured in accordance with embodiments of the disclosure. The NMD 503 includes voice capture components ("VCC", or collectively "voice processor 560"), a wake-word engine 570, and at least one voice extractor 572, each of which can be operably coupled to the voice processor 560. The NMD 503 further includes the microphones 222 and the at least one network interface 224 described above and may also include other components, such as audio amplifiers, interface, etc., which are not shown in FIG. 5 for purposes of clarity.

The microphones 222 of the NMD 503 can be configured to provide detected sound, S D, from the environment of the NMD 503 to the voice processor 560. The detected sound S D may take the form of one or more analog or digital signals. In example implementations, the detected sound S D may be composed of a plurality of signals associated with respective channels 562 that are fed to the voice processor 560.

Each channel 562 may correspond to a particular microphone 222. For example, an NMD having six microphones may have six corresponding channels. Each channel of the detected sound S D may bear certain similarities to the other channels but may differ in certain regards, which may be due to the position of the given channel's corresponding microphone relative to the microphones of other channels. For example, one or more of the channels of the detected sound S D may have a greater signal to noise ratio ("SNR") of speech to background noise than other channels.

As further shown in FIG. 5, the voice processor 560 includes an AEC 564, a spatial processor 566, and one or more buffers 568. In operation, the AEC 564 receives the detected sound S D and filters or otherwise processes the sound to suppress echoes and/or to otherwise improve the quality of the detected sound $S_D$. That processed sound may then be passed to the spatial processor 566.

The spatial processor 566 is typically configured to analyze the detected sound S D and identify certain characteristics, such as a sound's amplitude (e.g., decibel level), frequency spectrum, directionality, etc. In one respect, the spatial processor 566 may help filter or suppress ambient noise in the detected sound S D from potential user speech based on similarities and differences in the constituent channels 562 of the detected sound $S_D$, as discussed above. As one possibility, the spatial processor 566 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 566 may be configured to determine a speech presence probability, examples of such functionality are disclosed in U.S. patent application Ser. No. 15/984,073, filed May 18, 2018, titled "Linear Filtering for Noise-Suppressed Speech Detection," and U.S. patent application Ser. No. 16/147,710, filed Sep. 29, 2018, and titled "Linear Filtering for Noise-Suppressed Speech Detection via Multiple Network Microphone Devices," each of which is incorporated herein by reference in its entirety.

The wake-word engine 570 can be configured to monitor and analyze received audio to determine if any wake words are present in the audio. The wake-word engine 570 may analyze the received audio using a wake word detection algorithm. If the wake-word engine 570 detects a wake word, a network microphone device may process voice input contained in the received audio. Example wake word detection algorithms accept audio as input and provide an indication of whether a wake word is present in the audio. Many first- and third-party wake word detection processes are known and commercially available. For instance, operators of a voice service may make their processes available for use in third-party devices. Alternatively, a process may be trained to detect certain wake-words.

In some embodiments, the wake-word engine 570 runs multiple wake word detection processes on the received audio simultaneously (or substantially simultaneously). As noted above, different voice services (e.g. AMAZON's Alexa®, APPLE's Siri®, MICROSOFT's Cortana®, GOOGLE'S Assistant, etc.) each use a different wake word for invoking their respective voice service. To support multiple services, the wake-word engine 570 may run the received audio through the wake word detection process for each supported voice service in parallel. In such embodiments, the network microphone device 103 may include VAS selector components 574 configured to pass voice input to the appropriate voice assistant service. In other embodiments, the VAS selector components 574 may be omitted. In some embodiments, individual NMDs 103 of the MPS 100 may be configured to run different wake word detection processes associated with particular VASes. For example, the NMDs of playback devices 102a and 102b of the Living Room may be associated with AMAZON's ALEXA®, and be configured to run a corresponding wake word detection process (e.g., configured to detect the wake word "Alexa" or other associated wake word), while the NMD of playback device 102f in the Kitchen may be associated with GOOGLE's Assistant, and be configured to run a corresponding wake word detection process (e.g., configured to detect the wake word "OK, Google" or other associated wake word).

In some embodiments, a network microphone device may include speech processing components configured to further facilitate voice processing, such as by performing voice recognition trained to recognize a particular user or a particular set of users associated with a household. Voice recognition software may implement processes that are tuned to specific voice profile(s).

In operation, the one or more buffers 568—one or more of which may be part of or separate from the memory 213 (FIG. 2A)—capture data corresponding to the detected sound $S_D$. More specifically, the one or more buffers 568 capture detected-sound data that was processed by the upstream AEC 564 and spatial processor 566.

In general, the detected-sound data form a digital representation (i.e., sound-data stream), Sips, of the sound detected by the microphones 222. In practice, the sound-data stream Sips may take a variety of forms. As one possibility, the sound-data stream Sips may be composed of frames, each of which may include one or more sound samples. The frames may be streamed (i.e., read out) from the one or more buffers 568 for further processing by downstream components, such as the wake-word engine 570 and the voice extractor 572 of the NMD 503.

In some implementations, at least one buffer 568 captures detected-sound data utilizing a sliding window approach in which a given amount (i.e., a given window) of the most recently captured detected-sound data is retained in the at least one buffer 568 while older detected-sound data are overwritten when they fall outside of the window. For example, at least one buffer 568 may temporarily retain 20 frames of a sound specimen at given time, discard the oldest frame after an expiration time, and then capture a new frame, which is added to the 19 prior frames of the sound specimen.

In practice, when the sound-data stream Sips is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, signal-to-noise ratio, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

The voice processor 560 can also include at least one lookback buffer 569, which may be part of or separate from the memory 213 (FIG. 2A). In operation, the lookback buffer 569 can store sound metadata that is processed based on the detected-sound data S D received from the microphones 222. As noted above, the microphones 224 can include a plurality of microphones arranged in an array. The sound metadata can include, for example: (1) frequency response data for individual microphones of the array, (2) an echo return loss enhancement measure (i.e., a measure of the effectiveness of the acoustic echo canceller (AEC) for each microphone), (3) a voice direction measure; (4) arbitration statistics (e.g., signal and noise estimates for the spatial processing streams associated with different microphones); and/or (5) speech spectral data (i.e., frequency response evaluated on processed audio output after acoustic echo cancellation and spatial processing have been performed). Other sound metadata may also be used to identify and/or classify noise in the detected-sound data S D. Metadata in accordance with certain embodiments can also be used to generate labeled training data that can be used for various purposes, such as (but not limited to) training machine learning models, testing software processes, etc. In at least some embodiments, the sound metadata may be transmitted separately from the sound-data stream $S_{DS}$, as reflected in the arrow extending from the lookback buffer 569 to the network interface 224. For example, the sound metadata may be transmitted from the lookback buffer 569 to one or more remote computing devices separate from the VAS which receives the sound-data stream $S_{DS}$. In some embodiments, for example, the metadata can be transmitted to a remote service provider for analysis to construct or modify a noise classifier, as described in more detail below. Processes in accordance with various embodiments can use metadata to generate labeled training data and/or analyze real-world usage of NMDs.

In any case, components of the NMD 503 downstream of the voice processor 560 may process the sound-data stream $S_{DS}$. For instance, the wake-word engine 570 can be configured to apply one or more identification processes to the sound-data stream Sips (e.g., streamed sound frames) to spot potential wake words in the detected-sound $S_D$. When the wake-word engine 570 spots a potential wake word, the wake-word engine 570 can provide an indication of a "wake-word event" (also referred to as a "wake-word trigger") to the voice extractor 572 in the form of signal $S_W$.

In response to the wake-word event (e.g., in response to a signal $S_W$ from the wake-word engine 570 indicating the wake-word event), the voice extractor 572 can be configured to receive and format (e.g., packetize) the sound-data stream Sm. For instance, the voice extractor 572 packetizes the frames of the sound-data stream $S_{DS}$ into messages. The voice extractor 572 can transmit or stream these messages, $M_V$, that may contain voice input in real time or near real time, to a remote VAS, such as the VAS 190 (FIG. 1B), via the network interface 218.

Figure 6A:
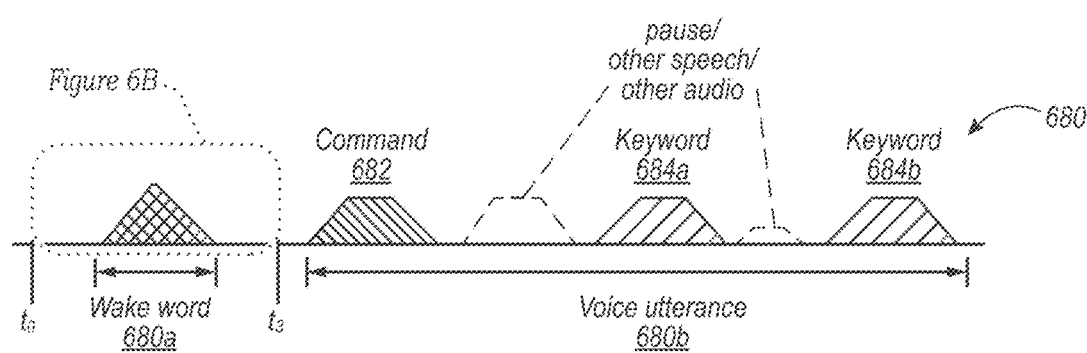
FIG. 6A is a diagram of an example voice input.

The VAS can be configured to process the sound-data stream $S_{DS}$ contained in the messages $M_V$ sent from the NMD 503. More specifically, the VAS can be configured to identify voice input based on the sound-data stream Sm. Referring to FIG. 6A, a voice input 680 may include a wake-word portion 680a and an utterance portion 680b. The wake-word portion 680a can correspond to detected sound that caused the wake-word event. For instance, the wake-word portion 680a can correspond to detected sound that caused the wake-word engine 570 to provide an indication of a wake-word event to the voice extractor 572. The utterance portion 680b can correspond to detected sound that potentially comprises a user request following the wake-word portion 680a.

Figure 6B:
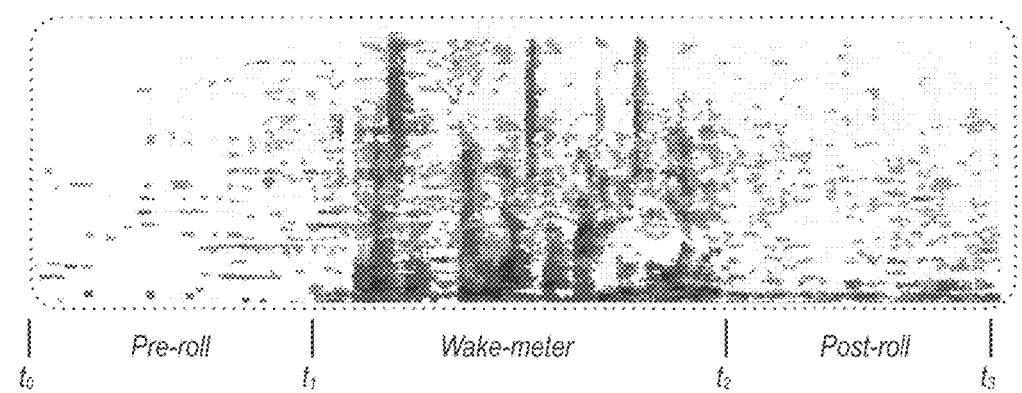
FIG. 6B is a graph depicting an example sound specimen in accordance with aspects of the disclosure.

As an illustrative example, FIG. 6B shows an example first sound specimen. In this example, the sound specimen corresponds to the sound-data stream Sips (e.g., one or more audio frames) associated with the spotted wake word 680a of FIG. 6A. As illustrated, the example first sound specimen comprises sound detected in the playback device 102i's environment (i) immediately before a wake word was spoken, which may be referred to as a pre-roll portion (between times to and $t_1$), (ii) while the wake word was spoken, which may be referred to as a wake-meter portion (between times $t_1$ and $t_2$), and/or (iii) after the wake word was spoken, which may be referred to as a post-roll portion (between times $t_2$ and $t_3$). Other sound specimens are also possible.

Typically, the VAS may first process the wake-word portion 680a within the sound-data stream Sips to verify the presence of the wake word. In some instances, the VAS may determine that the wake-word portion 680a comprises a false wake word (e.g., the word "Election" when the word "Alexa" is the target wake word). In such an occurrence, the VAS may send a response to the NMD 503 (FIG. 5) with an indication for the NMD 503 to cease extraction of sound data, which may cause the voice extractor 572 to cease further streaming of the detected-sound data to the VAS. The wake-word engine 570 may resume or continue monitoring sound specimens until another potential wake word, leading to another wake-word event. In some implementations, the VAS may not process or receive the wake-word portion 680a but instead processes only the utterance portion 680b.

In any case, the VAS processes the utterance portion 680b to identify the presence of any words in the detected-sound data and to determine an underlying intent from these words. The words may correspond to a certain command and certain keywords 684 (identified individually in FIG. 6A as a first keyword 684a and a second keyword 684b). A keyword may be, for example, a word in the voice input 680 identifying a particular device or group in the MPS 100. For instance, in the illustrated example, the keywords 684 may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion 680b may include additional information, such as detected pauses (e.g., periods of non-speech) between words spoken by a user, as shown in FIG. 6A. The pauses may demarcate the locations of separate commands, keywords, or other information spoke by the user within the utterance portion 680b.

Based on certain command criteria, the VAS may take actions as a result of identifying one or more commands in the voice input, such as the command 682. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these devices (e.g., raise/lower volume, group/ungroup devices, etc.), turn on/off certain smart devices, among other actions. After receiving the response from the VAS, the wake-word engine 570 the NMD 503 may resume or continue to monitor the sound-data stream Sips until it spots another potential wake-word, as discussed above.

Referring back to FIG. 5, in multi-VAS implementations, the NMD 503 may include a VAS selector 574 (shown in dashed lines) that is generally configured to direct the voice extractor's extraction and transmission of the sound-data stream $S_{DS}$ to the appropriate VAS when a given wake-word is identified by a particular wake-word engine, such as the first wake-word engine 570a, the second wake-word engine 570b, or the additional wake-word engine 571. In such implementations, the NMD 503 may include multiple, different wake-word engines and/or voice extractors, each supported by a particular VAS. Similar to the discussion above, each wake-word engine may be configured to receive as input the sound-data stream Sips from the one or more buffers 568 and apply identification algorithms to cause a wake-word trigger for the appropriate VAS. Thus, as one example, the first wake-word engine 570a may be configured to identify the wake word "Alexa" and cause the NMD 503 to invoke the AMAZON VAS when "Alexa" is spotted. As another example, the second wake-word engine 570b may be configured to identify the wake word "Ok, Google" and cause the NMD 503 to invoke the GOOGLE VAS when "Ok, Google" is spotted. In single-VAS implementations, the VAS selector 574 may be omitted.

In additional or alternative implementations, the NMD 503 may include other voice-input identification engines 571 (shown in dashed lines) that enable the NMD 503 to operate without the assistance of a remote VAS. As an example, such an engine may identify in detected sound certain commands (e.g., "play," "pause," "turn on," etc.) and/or certain keywords or phrases, such as the unique name assigned to a given playback device (e.g., "Bookcase," "Patio," "Office," etc.). In response to identifying one or more of these commands, keywords, and/or phrases, the NMD 503 may communicate a signal (not shown in FIG. 5) that causes the audio processing components 216 (FIG. 2A) to perform one or more actions. For instance, when a user says "Hey Sonos, stop the music in the office," the NMD 503 may communicate a signal to the office playback device 102*n*, either directly, or indirectly via one or more other devices of the MPS 100, which causes the office device 102*n* to stop audio playback. Reducing or eliminating the need for assistance from a remote VAS may reduce latency that might otherwise occur when processing voice input remotely. In some cases, the identification algorithms employed may be configured to identify commands that are spoken without a preceding wake word. For instance, in the example above, the NMD 503 may employ an identification algorithm that triggers an event to stop the music in the office without the user first saying "Hey Sonos" or another wake word.

III. Systems and Methods for Generating Sample Data

Systems and methods in accordance with numerous embodiments can be used to generate diverse and realistic audio samples based on metadata gathered from "real-world" samples. In certain embodiments, generated training data can be used to develop and/or test various test elements, such as (but not limited to) software processes, machine learning models, NMDs, and/or other sensor systems. In many embodiments, generated training data can be used to tune parameters of voice front-end digital signal processing (e.g., acoustic echo canceller (AEC), multichannel wiener filter (MCWF), etc.).

Various parts of described systems and methods for generating sample data and/or developing test elements described herein can be performed on an NMD and/or remotely, for example, on remote computing device(s). In several embodiments, remote computing devices can perform remote evaluation and processing of sound metadata for generating sample training data. In at least some embodiments, any or all of the parts of the methods described herein can be performed on NMDs rather than at remote computing devices.

a. Methods for Generating Sample Data

Figure 7:
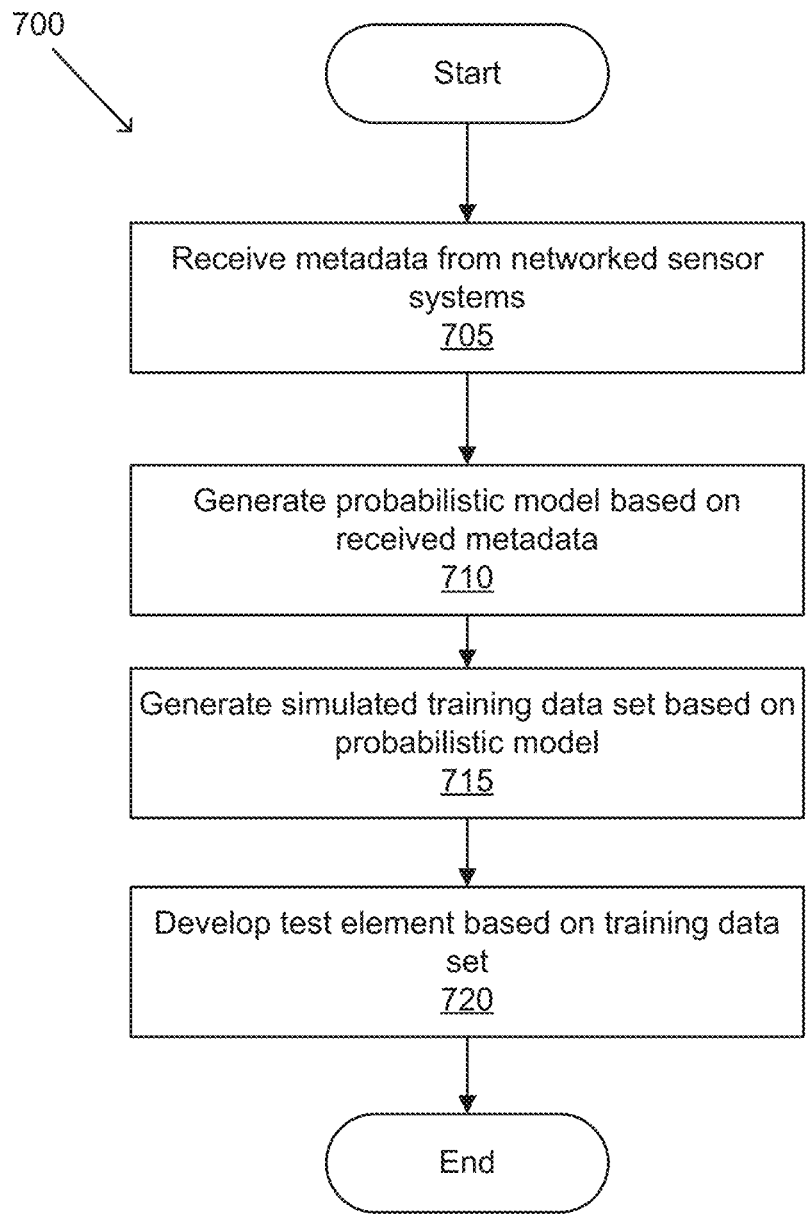
FIG. 7 conceptually illustrates an example of a process for generating training data based on metadata from networked sensor systems.

FIG. 7 conceptually illustrates an example of a process for generating training data based on metadata from networked sensor systems. Training data in accordance with certain embodiments can be based on sound metadata collected from NMDs of a number of different users in various operating environments.

Process 700 receives (705) metadata from networked sensor systems. Metadata in accordance with many embodiments can include various characteristics of inputs detected by the networked sensor systems. Sound metadata in accordance with some embodiments may include (but is not limited to) frequency response data, an echo return loss enhancement measure (e.g., a measure of the effectiveness of an acoustic echo canceller (AEC) for each microphone), a voice direction measure; arbitration statistics (e.g., signal and noise estimates for the spatial processing streams associated with different microphones), and/or speech spectral data (e.g., frequency response evaluated on processed audio output after acoustic echo cancellation and spatial processing have been performed). Metadata in accordance with several embodiments can include, but is not limited to, configuration parameters of the media playback system, information about audio content currently playing via the media playback system, historical information about audio content played by the media playback system, user preference information relating to audio content, user preference information relating to media playback system configuration, and/or any other metadata disclosed and/or described herein.

In numerous embodiments, sound metadata can be received from NMDs at remote computing devices. For example, remote computing devices can collect sound metadata data from one or more NMDs. In some embodiments, remote computing devices can collect sound metadata from a large population of NMDs, and such population metadata can be used to generate realistic and diverse real-world sample data. In certain embodiments, sound metadata can be generated on the NMD locally from the detected sound during a voice interaction (e.g., as identified by detection of a wake-word). Sound metadata in accordance with a variety of embodiments can be based on a triggered event (wake word) and/or the following utterance. For example, the trigger event can be the detection of audio signals having some specified property (e.g., detected audio levels above a predetermined threshold, detected audio signals for a predetermined length of time, etc.). Once a trigger event is detected, an indication can be provided to a voice processor, which can in turn provide sound metadata to a remote computing device. In various embodiments, sound metadata can be based on the sound data from an array of microphones, collectively and/or for each individual channel.

In numerous embodiments, raw audio files are never provided to remote computing devices (other than VASes for the purpose of identifying the commands in the utterance). The sound metadata may be constructed such that the underlying raw audio file on which the sound metadata is based cannot be reconstructed from the sound metadata (i.e., to maximize user privacy). The sound metadata may be stored in a lookback buffer on the NMD and subsequently provided to the Sonos cloud. Because the sound metadata is derived from the sound data but does not reveal the sound data, sending only the sound metadata to the remote computing devices allows for the evaluation of real-world situations without exposing the actual audio content from which the sound data is derived.

Metadata in accordance with certain embodiments can also include information separate and apart from the sound metadata. For example, other types of metadata can include (but are not limited to) generic survey data regarding households (e.g., room size, etc.) and/or other user data that is gathered based on a user's settings and/or preferences.

Process 700 generates (710) a probabilistic model based on the received metadata. Probability models in accordance with certain embodiments can include one or more probability distribution functions (PDFs) that each represent characteristics of the population of received metadata. In a variety of embodiments, a probability density function (PDF) may be separately generated for each sound metadata characteristic. Processes in accordance with several embodiments can include conditional PDFs with interdependencies between two or more characteristics. For example, processes in accordance with a number of embodiments can generate a PDF showing the distribution of a particular characteristic (e.g., signal-to-echo ratio) given a certain spectral shape. Visualizations of example PDFs for Signal-to-Echo Ratios and Signal-to-Noise Ratios across various different devices are illustrated in FIG. 8. Specifically, this figure illustrates a signal-to-echo ratio distribution 805 and a signal-to-noise ratio distribution 810 for a SONOS ONE (first generation), BEAM, SONOS ONE G2 (second generation), and MOVE. The first distribution 805 illustrates a signal-to-echo ratio distribution of selfsound commands. Selfsound commands are commands made by a user while the device is playing audio (e.g., "Alexa, turn up the volume."). The second distribution 810 illustrates a signal-to-noise ratio distribution of non-selfsound commands. Non-selfsound commands are commands made by the user when the device is not playing back audio (e.g., "Alexa, play music").

Process 700 generates (715) a simulated training dataset based on the probabilistic model. In a variety of embodiments, simulated training datasets can be built to simulate samples in a number of different scenarios. Scenarios can be drawn from the probabilistic model as a set of characteristic values based on occurrences of the characteristic values in a population. Simulated training datasets in accordance with certain embodiments can be generated by simulating each scenario for each of a number of samples. An example process for generating a simulated training dataset in accordance with an embodiment is described in greater detail below with reference to FIG. 9. In a number of embodiments, simulated datasets are generated from "clean" samples, or high-quality, samples recorded in a controlled environment. Clean samples in accordance with certain embodiments can be annotated with various labels (including, but not limited to, spoken text, age, gender, etc.) that can be used for development (e.g., training and/or testing).

Process 700 develops (720) a test element based on the simulated training dataset. Developing a test element in accordance with several embodiments can include validating and/or training a machine learning model. Machine learning models in accordance with many embodiments can be trained by computing losses based on the annotated samples and modifying a model to update parameters (e.g., weights) of the model (e.g., through backpropagation). In various embodiments, developing can include (but is not limited to) testing, modifying, and/or developing software (e.g., wake word detection, noise reduction processes, etc.) or hardware (e.g., NMDs, microphone array configurations, etc.). Testing for an NMD in accordance with certain embodiments can include (but is not limited to) evaluating the performance of a software process operating on an NMD, testing the performance of a physical prototype for an NMD, etc. Adjustment of NMDs can include modifying a playback volume, adjusting a fixed gain, modifying a noise-reduction parameter, a wake-word-detection sensitivity parameter, and/or adjusting a spatial processing algorithm. Modifying an NMD can also include physical modifications, such as (but not limited to) adding/removing microphones, modifying the orientation of a microphone, and/or changing the materials of an NMD.

In a number of embodiments, developing a test element can include identifying potential device adjustments that would improve detection and processing of voice input in the presence of different noise conditions. For example, a virtual test framework can be used to run a large number of simulations using a Monte Carlo approach, representing the expected performance of NMDs by users in the real world. Samples from simulated training datasets can be processed by simulated (or prototype) NMDs having a range of different performance parameter values. The best-performing parameter values can then be identified based on the simulated results. In some embodiments, the best-performing parameters are determined at least in part by the rate of false-positives and false-negatives in wake-word detection.

Processes in accordance with certain embodiments can further update deployed networked sensor systems based on the results of developing a test element. For example, when better performing performance parameters are identified through a development process, they may then be used to modify performance of NMDs in the real world. In various embodiments, processes can upload trained models and/or updated software processes to deployed NMDs.

While specific processes for developing a test element are described above, any of a variety of processes can be utilized as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments are described in reference to audio microphone systems, the techniques disclosed herein may be used in any type of sensor systems, including (but not limited to) video, positioning, and/or wireless signals.

Figure 9:
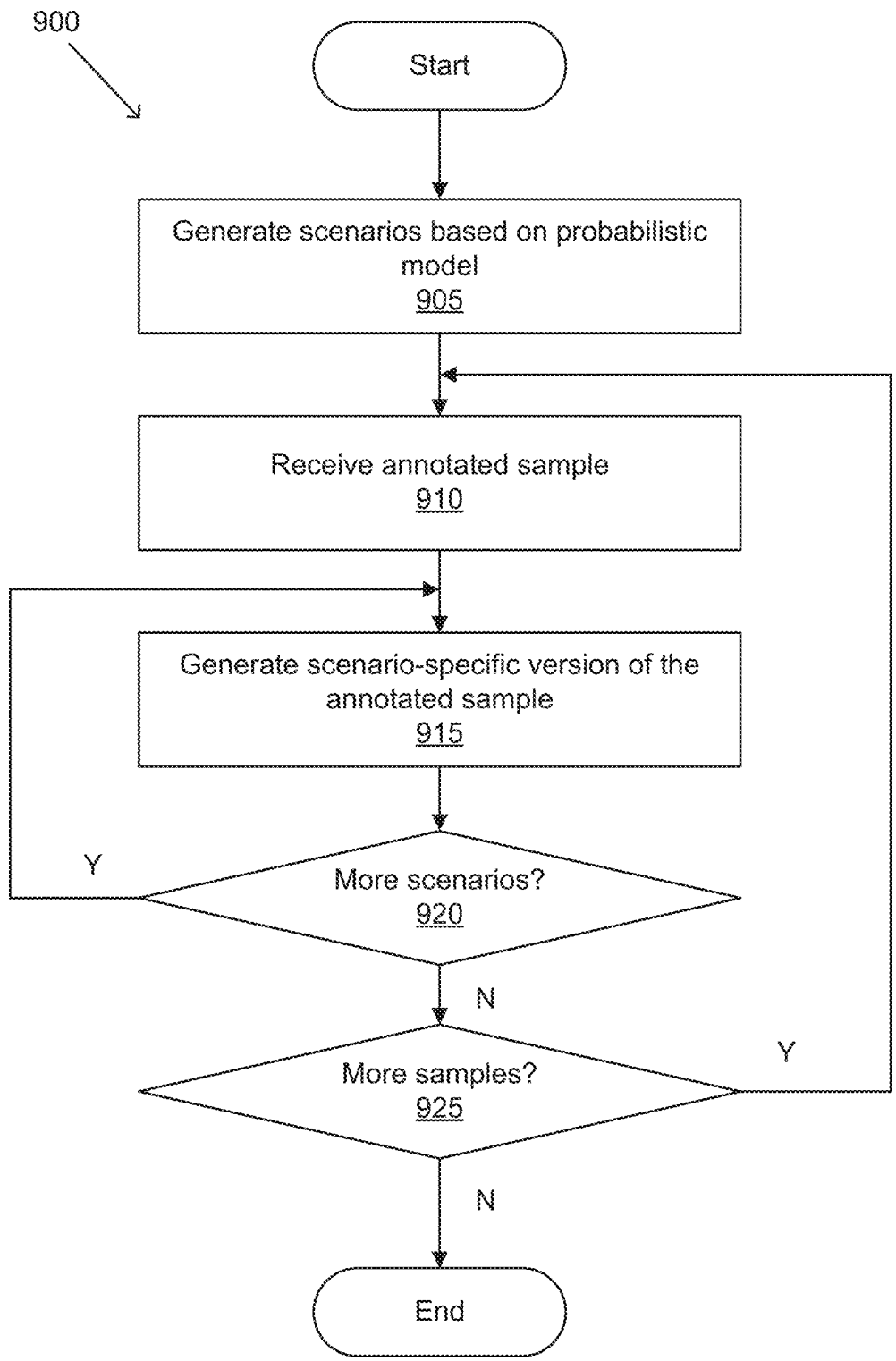
FIG. 9 conceptually illustrates an example of a process for generating training data samples according to a variety of scenarios.

FIG. 9 conceptually illustrates an example of a process for generating training data samples according to a variety of scenarios. Process 900 generates (905) scenarios based on a probabilistic model. Probabilistic models in accordance with some embodiments can include one or more PDFs for various characteristics identified in metadata associated with signals of networked sensor systems. In various embodiments, scenarios can be generated by characteristic values for each scenario from the probabilistic model. As can readily be appreciated, any of a variety of probabilistic models can be utilized to generate characteristic values for scenarios as appropriate to the requirements of specific applications.

Process 900 receives (910) an annotated sample. Samples in accordance with a variety of embodiments can be annotated with various sample characteristics, such as (but not limited to) spoken text, phonemes, and/or speaker characteristics (e.g., gender, accent, age, etc.). Samples in accordance with various embodiments include "clean" samples, or high-quality, samples recorded in a controlled environment.

Process 900 can generate (915) a scenario-specific version of the annotated sample. In many embodiments, processes can generate a scenario-specific sample using a simulator that simulates an audio environment (e.g., a virtual room model) based on the characteristic values of a given scenario. Scenario-specific samples in accordance with a variety of embodiments can be simulated to reflect various characteristics, such as (but not limited to) background noise, echo, directionality, and/or amplitude. The generated samples (or noised samples) can then be stored for use as training or testing data, or transmitted to be shared with other computing devices for training, testing, and/or development.

Process 900 determines (920) whether there are more scenarios. When there are more scenarios, the process generates (915) at least one scenario-specific version of the annotated sample based on the next scenario. When the process determines (920) that there are no more scenarios, process 900 determines (925) whether there are more samples to be processed. When there are more samples, the process can return to step 910 to receive the next annotated sample. When there are no more samples, the process can terminate.

While specific processes for generating training data samples are described above, any of a variety of processes can be utilized as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments are described in reference to audio microphone systems, the techniques disclosed herein may be used in any type of sensor systems, including (but not limited to) video, positioning, and/or wireless signals.

b. Development System

Figure 10:
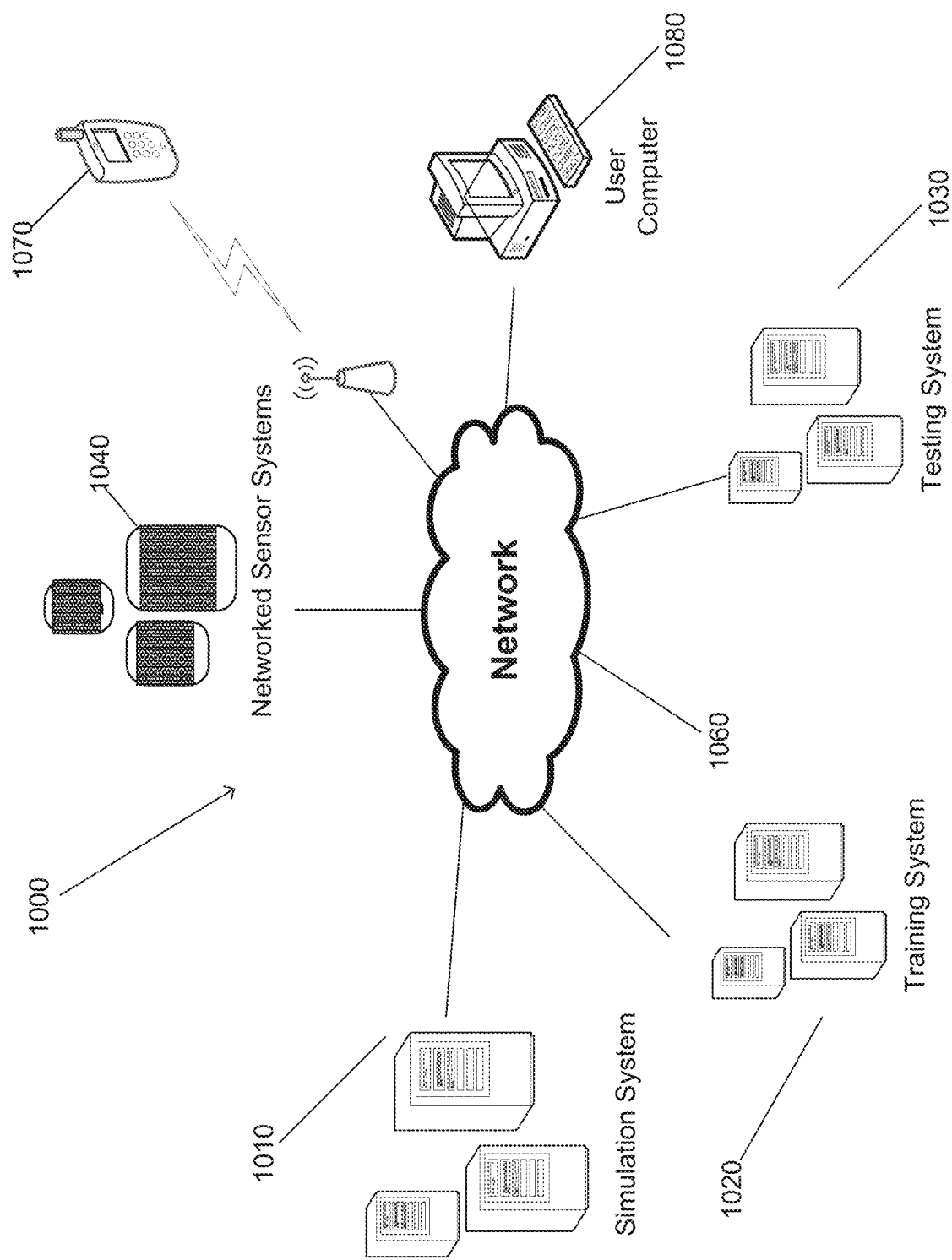
FIG. 10 illustrates an example of a networked device system in accordance with an embodiment.

An example of a development system that can be used to gather metadata, generate simulated training data, as well as to test, train, and develop test elements in accordance with some embodiments is shown in FIG. 10. Development system 1000 includes a communications network 1060. The communications network 1060 can be a network such as the Internet that allows devices connected to the network 1060 to communicate with other connected devices. Server systems 1010, 1020, and 1030 can be connected to the network 1060. Each of the server systems 1010, 1020, and 1030 can be a group of one or more servers communicatively connected to one another via internal networks that execute processes that can provide cloud services to users over the network 1060. For purposes of this discussion, cloud services are one or more applications that are executed by one or more server systems to provide data and/or executable applications to devices over a network. The server systems 1010, 1020, and 1030 are shown each having three servers in the internal network. However, the server systems 1010, 1040 and 1070 may include any number of servers and any additional number of server systems may be connected to the network 1060 to provide cloud services.

In accordance with various embodiments, development systems that use systems and methods that gather metadata, generate simulated training data, as well as to test, train, and develop test elements in accordance with an embodiment may be provided by a process being executed on a single server system and/or a group of server systems communicating over network 1060. In this example, development system 1000 includes simulation system 1010, training system 1020, and testing system 1030 for performing simulations, as well as testing and training test elements in accordance with certain embodiments.

System 1000 also includes networked sensor systems 1040. networked sensor systems in accordance with many embodiments can include NMDs with microphone arrays. In a number of embodiments, an array of individual microphones can detect sound and provide sound data to a voice processor over multiple channels (e.g., with each microphone having a corresponding channel). The microphones can be arranged to detect sound in the environment of the NMD. In one example, the microphone(s) may be arranged to detect audio from one or more directions relative to the NMD. The microphone(s) may further be arranged to capture location information of an audio source (e.g., voice, audible sound) and/or to assist in filtering any identified noise. In several embodiments, sound metadata can be gathered from the NMDs to generate simulation scenarios for generating training data samples.

Users may use personal devices 1070 and 1080 that connect to the network 1060 to perform processes in accordance with various embodiments. For example, personal devices can be used to gather various information, including (but not limited to) metadata, user preferences, and/or environmental data. Personal devices can also be used to operate software that is developed in processes in accordance with some embodiments. In the shown embodiment, the personal devices 1080 are shown as desktop computers that are connected via a conventional "wired" connection to the network 1060. However, the personal device 1080 may be a desktop computer, a laptop computer, a smart television, an entertainment gaming console, or any other device that connects to the network 1060 via a "wired" connection. The mobile device 1070 connects to network 1060 using a wireless connection. A wireless connection is a connection that uses Radio Frequency (RF) signals, Infrared signals, or any other form of wireless signaling to connect to the network 1060. In FIG. 10, the mobile device 1080 is a mobile telephone. However, mobile device 1080 may be a mobile phone, Personal Digital Assistant (PDA), a tablet, a smartphone, or any other type of device that connects to network 1060 via wireless connection without departing from the scope of the present disclosure.

As can readily be appreciated the specific computing system used to gather metadata, generate simulated training data, test, train, and/or develop test elements is largely dependent upon the requirements of a given application and should not be considered as limited to any specific computing system(s) implementation.

c. Training Data Generation Element

Figure 11:
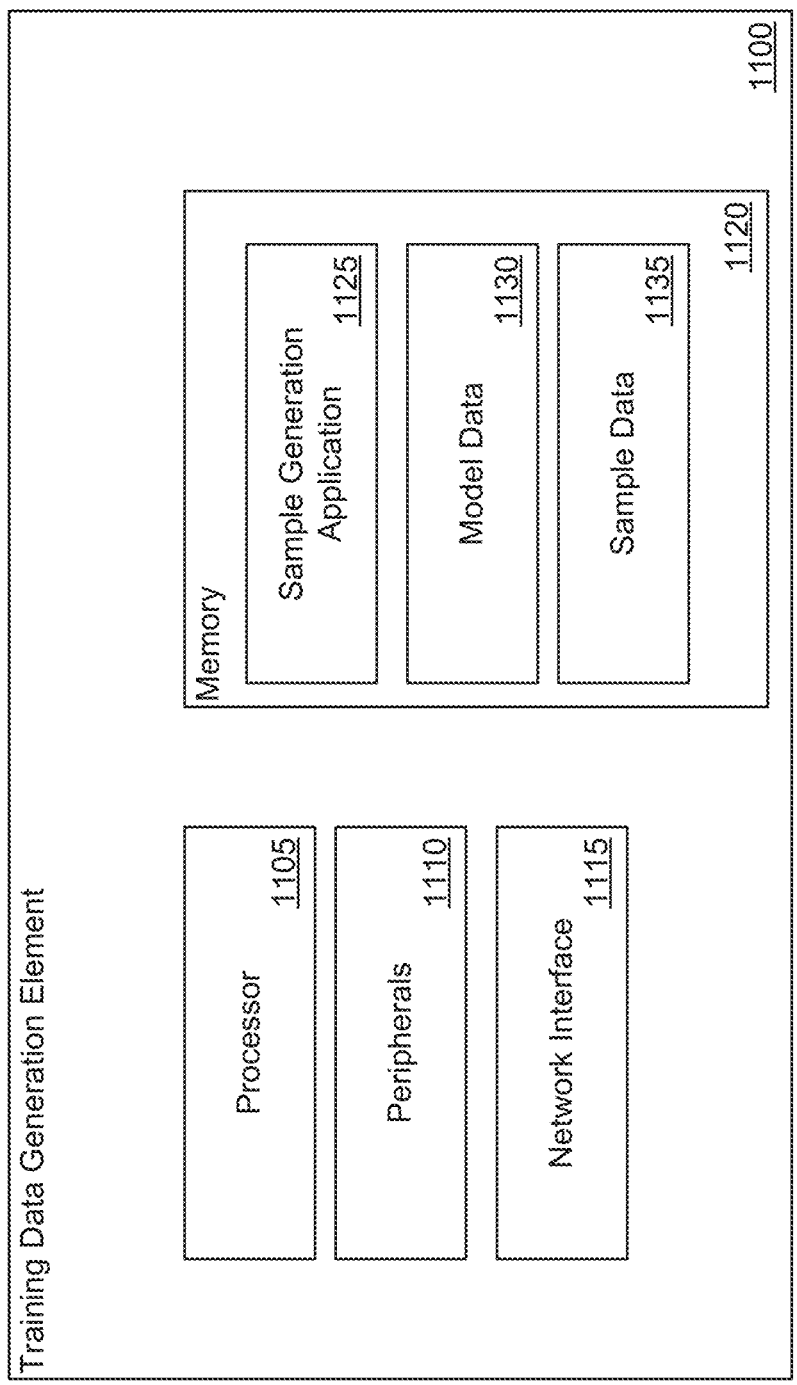
FIG. 11 illustrates an example of a generation element that generates training data in accordance with an embodiment.

An example of a training data generation element that can execute instructions to perform processes that generate training data and/or develop test elements in accordance with various embodiments is shown in FIG. 11. Training data generation elements in accordance with many embodiments can include (but are not limited to) one or more of mobile devices, cloud services, servers, and/or personal computers. Training data generation element 1100 includes processor 1105, peripherals 1110, network interface 1115, and memory 1120.

One skilled in the art will recognize that a particular training data generation element may include other components that are omitted for brevity without departing from the scope of the present disclosure. The processor 1105 can include (but is not limited to) a processor, microprocessor, controller, or a combination of processors, microprocessor, and/or controllers that performs instructions stored in the memory 1120 to manipulate data stored in the memory. Processor instructions can configure the processor 1105 to perform processes in accordance with certain embodiments.

Peripherals 1110 can include any of a variety of components for capturing data, such as (but not limited to) cameras, displays, and/or sensors. In a variety of embodiments, peripherals can be used to gather inputs and/or provide outputs. Network interface 1115 allows training data generation element 1100 to transmit and receive data over a network based upon the instructions performed by processor 1105. Peripherals and/or network interfaces in accordance with many embodiments can be used to gather inputs (e.g., samples, metadata, etc.) that can be used to generate scenarios and/or generate simulated samples.

Memory 1120 includes a sample generation application 1125, model parameters 1130, and training data 1135. Sample generation applications in accordance with several embodiments can be used to generate training data samples and/or develop test elements. Model parameters in accordance with some embodiments can include parameters for a machine learning model trained using simulated training data from the sample generation application. Sample data can include clean samples that are noised to generate the training date.

Figure 12:
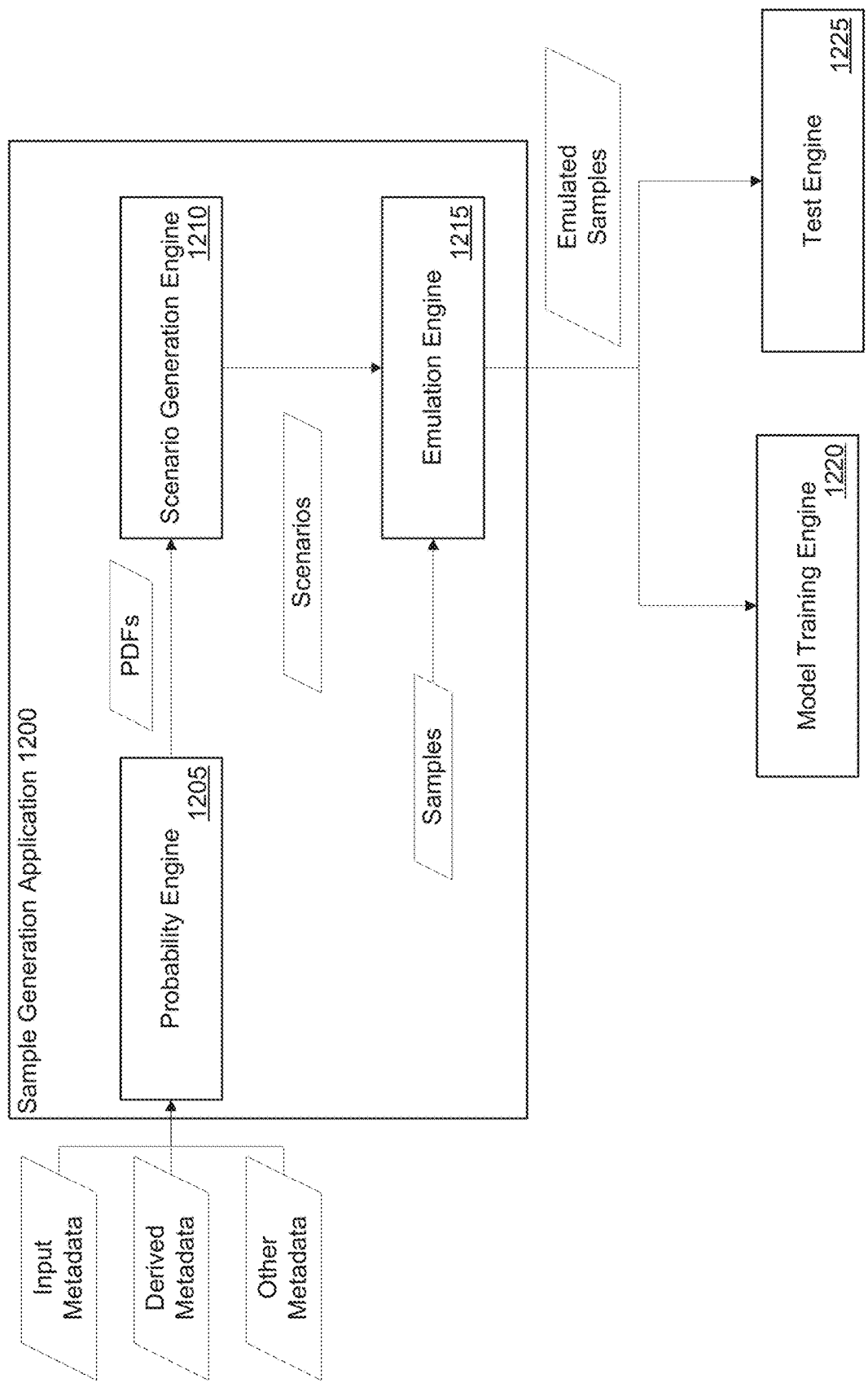
FIG. 12 illustrates an example of a sample generation application in accordance with an embodiment.

Although a specific example of a training data generation element 1100 is illustrated in FIG. 11, any of a variety of such elements can be utilized to perform processes similar to those described herein as appropriate to the requirements of specific applications in accordance with embodiments.

d. Sample Generation Application FIG. 12 illustrates an example of a sample generation application in accordance with an embodiment. Sample generation applications in accordance with a variety of embodiments can be used for generating noised training samples that can be used for various training processes. In this example, the sample generation application includes probability engine 1205, scenario generation engine 1210, simulation engine 1215, model training engine 1220, and test engine 1225. As can readily be appreciated, sample generation applications can be implemented using any of a variety of configurations appropriate to the requirements of specific applications.

Probability engines in accordance with numerous embodiments can analyze sound metadata to determine probability distributions for various characteristics (or parameters) from the metadata. In several embodiments, sound metadata can be gathered as users interact with the NMDs operating in a number of different real-world environments. Sound metadata in accordance with many embodiments can include (but is not limited to) voice volumes, signal-to-noise ratios, signal-to-echo ratios, and/or speech spectra associated with real-world voice interactions. In numerous embodiments, sound metadata may be provided from the NMDs themselves, derived from other sound metadata provided by the NMDs, generated by a sample generation application based on audio data, and/or provided through other means. For example, an NMD may provide the speech spectra associated with a given voice interaction, along with one or more sound metadata characteristics that may be derived from the speech spectra associated with the given voice interaction.

Metadata in accordance with certain embodiments can also include information separate and apart from the sound metadata. For example, other types of metadata can include (but are not limited to) generic survey data regarding households (e.g., room size, etc.) and/or other user data that is gathered based on a user's settings and/or preferences.

Once the metadata is received, probability engines in accordance with some embodiments can build (or update) a probability model to represent the probability distributions for metadata characteristics. Probability models in accordance with certain embodiments can include one or more probability distribution functions (PDFs) that each represent characteristics of a population of metadata. In a variety of embodiments, a probability density function (PDF) may be separately generated for each sound metadata characteristic. Probability models in accordance with several embodiments can include conditional PDFs with interdependencies between two or more characteristics. For example, processes in accordance with a number of embodiments can generate a PDF showing the distribution of a particular characteristic (e.g., signal-to-echo ratio) given a certain spectral shape.

Based on probability engines, scenario generation engines in accordance with certain embodiments can generate a set of scenarios (e.g., 1,000 scenarios, 10,000 scenarios, etc.), where each scenario is described by characteristic values for the characteristics of the scenario. Scenario generation engines in accordance with various embodiments can vary the value of each characteristic in accordance with the probability engine. In this manner, the set of scenarios can be drawn from the probability engines to comport with the frequency of particular characteristic values for that given characteristic. A set of scenarios may be thought of as a table where each row is a scenario and each column is a particular characteristic value (e.g., signal-to-noise ratio value, signal-to-echo ratio value, etc.). As can readily be appreciated, sets of scenarios can be represented and/or generated in any manner appropriate to the requirements of a given application.

Simulation engines in accordance with numerous embodiments can simulate noise for a given sample to generate a scenario-specific version of the sample. The set of scenarios may be employed as an input to an acoustic simulation (e.g., a virtual room model). The acoustic simulation may receive, as inputs, the values associated with each parameter in a given scenario; and a speech sample. The acoustic simulation may, in turn, be employed to obtain a noised version of the speech sample that is representative of what a network microphone device would detect during a real-life voice interaction (as defined by the received parameter values). Thus, the acoustic simulation may be employed to create a noise speech sample for each of the scenarios in the set of scenarios (given 1 speech sample). This noised speech may be labeled with, for example, information regarding the original speech that the noised speech was derived from (e.g., the noised speech sample corresponds to a user saying "Alexa, play music"). Simulated characteristics can include (but are not limited to) background noise, echo, directionality, and/or amplitude. In this manner, simulated training data can be generated to reflect real-world scenarios for a given set of samples.

Test engines in accordance with some embodiments can be used to test the performance of a test element (e.g., software processes, machine learning models, NMDs, and/or other sensor systems). For example, test engines in accordance with many embodiments can be used to test the performance of a wake-word detection process based on simulated training data from a variety of different scenarios. As another example, test engines can validate a modification to a network microphone device. For example, engineers of an NMD may want to know the performance impact of removing a microphone from every microphone array to reduce manufacturing costs. To perform such a test, a model of the modified NMD (e.g., with one less microphone) may be constructed. The labeled speech data may be, in turn, provided to the modified NMD model to obtain a set of predicted actions that the modified NMD would perform. The set of predicted actions may then be compared to the labeled speech data to identify how many of those interactions were processed correctly. Similarly, software changes to NMDs can also be validated to access the performance impact, such as modifying the way in which the detected audio is initially processed to remove noise prior to being provided as an input to a wake-word engine.

In some embodiments, model training engines can be used to train a machine learning model. For example, labeled speech data may be employed to train a machine learning model to detect speech from a simulated noised sample. The speech sample to be noised may be a speech sample of a wake-word (e.g., Alexa). In this example, thousands of versions of the wake-word speech samples may be generated with noise in accordance with various different scenarios. These noised speech samples may be employed, in turn, to train a machine learning model to accurately detect the particular wake-word in the speech sample in the presence of real-world noise. In a variety of embodiments, trained machine learning models may be downloaded to network microphone devices to accurately detect utterance of the wake-word.

Although a specific example of a sample generation application 1200 is illustrated in FIG. 12, any of a variety of sample generation applications can be utilized to perform processes for gathering metadata, generating scenarios, simulating training data, and/or training test elements similar to those described herein as appropriate to the requirements of specific applications in accordance with embodiments. In some embodiments, one or more of the above elements may be omitted and/or additional elements may be added. Although the above embodiments are described in reference to audio microphone systems, the techniques disclosed herein may be used in any type of sensor system, including (but not limited to) video, positioning, and/or wireless signals.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

In addition to the examples described herein with respect to stationary playback devices, embodiments of the present technology can be applied to headphones, earbuds, or other in- or over-ear playback devices. For example, such in- or over-ear playback devices can include noise-cancellation functionality to reduce the user's perception of outside noise during playback. In some embodiments, noise classification can be used to modulate noise cancellation under certain conditions. For example, if a user is listening to music with noise-cancelling headphones, the noise cancellation feature may be temporarily disabled or down-regulated when a user's doorbell rings. Alternatively or additionally, the playback volume may be adjusted based on detection of the doorbell chime. By detecting the sound of the doorbell (e.g., by correctly classifying the doorbell based on received sound metadata), the noise cancellation functionality can be modified so that the user is able to hear the doorbell even while wearing noise-cancelling headphones. Various other approaches can be used to modulate performance parameters of headphones or other such devices based on the noise classification techniques described herein.

It should be appreciated that references to transmitting information to particular devices and/or systems herein should be understood to include transmitting information (e.g., messages, requests, responses) indirectly or directly to the particular devices and/or systems. Thus, the information being transmitted to the particular devices and/or systems may pass through any number of intermediary devices and/or systems prior to reaching its destination. For example, a control device may transmit information to a playback device by first transmitting the information to a computing system that, in turn, transmits the information to the playback device. Further, modifications may be made to the information by the intermediary devices. For example, intermediary devices may modify a portion of the information, reformat the information, and/or incorporate additional information.

Similarly, references to receiving information from particular devices and/or systems herein should be understood to include receiving information (e.g., messages, requests, responses) indirectly or directly from the particular devices and/or systems. Thus, the information being received from the particular devices and/or systems may pass through any number of intermediary devices and/or systems prior to being received. For example, a control device may receive information from a playback device indirectly by receiving information from a cloud server that originated from the playback device. Further, modifications may be made to the information by the intermediary devices. For example, intermediary devices may modify a portion of the information, reformat the information, and/or incorporate additional information.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computer system comprising:
  a communication interface configured to facilitate communication via at least one data network;
  at least one processor; and
  at least one non-transitory computer-readable medium comprising program instructions that are executable by the at least one processor such that the computer system is configured to:
    receive a plurality of sets of sound data captured using a plurality of network microphone devices (NMDs), where each of the NMDs is configured in accordance with a set of NMD software configuration parameters;
    receive, for each captured set of sound data, sound metadata associated with a respective captured set of sound data, where each piece of sound metadata comprises a set of characteristics for a set of sound data;
    generate a probabilistic model based on the received sound metadata;
    perform a plurality of acoustic simulations to obtain a noised version of a training data set of annotated speech samples at least in part by:
      generating a plurality of scenarios, wherein, for a scenario of the plurality of scenarios:
        the scenario comprises a set of characteristics for a set of sound data; and
        values for characteristics in the set of characteristics for the scenario are drawn from the probabilistic model; and for each of the plurality of scenarios, generating a noised version of a specific annotated speech sample by performing an acoustic simulation based upon a specific scenario from the plurality of scenarios;
simulate performance of a set of modified NMD software configuration parameters using the noised version of the training data set of annotated speech samples; and
cause software on at least one NMD to be updated based on the set of modified NMD software configuration parameters.

2. The computer system of claim 1, wherein the set of characteristics comprises at least one of frequency response data for individual microphones of a plurality of microphones of the at least one NMD, an echo return loss enhancement measure, a voice direction measure, signal and noise estimates, and speech spectral data.

3. The computer system of claim 1, wherein the sound metadata comprises contextual data, where the contextual data comprises at least one of:
environmental data that describes an environment of the at least one NMD, and
user data that describes a user associated with the at least one NMD.

4. The computer system of claim 1, wherein the probabilistic model comprises at least one probability density function (PDF) that describes a joint distribution for at least two characteristics from the set of characteristics.

5. The computer system of claim 1, wherein each annotated speech sample is annotated with at least one of spoken text and speaker characteristics.

6. The computer system of claim 1, wherein the set of NMD software configuration parameters comprise at least one of a playback volume level, gain level, a noise-reduction parameter, and a wake-word-detection sensitivity parameter.

7. The computer system of claim 1, wherein performing the acoustic simulation comprises generating a virtual room model based on a given scenario.

8. The computer system of claim 1, wherein captured sound data cannot be reconstructed from the received sound metadata.

9. A method for updating software configuration parameters of at least one network microphone device (NMD), the method comprising:
receiving a plurality of sets of sound data captured using a plurality of network microphone devices (NMDs), where each of the NMDs is configured in accordance with a set of NMD software configuration parameters;
receiving, for each captured set of sound data, sound metadata associated with a respective captured set of sound data, where each piece of sound metadata comprises a set of characteristics for a set of sound data;
generating a probabilistic model based on the received sound metadata;
performing a plurality of acoustic simulations to obtain a noised version of a training data set of annotated speech samples, wherein performing the plurality of acoustic simulations comprises:
generating a plurality of scenarios, wherein, for a scenario of the plurality of scenarios:
the scenario comprises a set of characteristics for a set of sound data; and
values for characteristics in the set of characteristics for the scenario are drawn from the probabilistic model; and
for each of the plurality of scenarios, generating a noised version of a specific annotated speech sample by performing an acoustic simulation based upon a specific scenario from the plurality of scenarios;
simulating performance of a set of modified NMD software configuration parameters using the noised version of the training data set of annotated speech samples; and
causing software on at least one NMD to be updated based on the set of modified NMD software configuration parameters.

10. The method of claim 9, wherein the set of characteristics comprises at least one of frequency response data for individual microphones of a plurality of microphones of the at least one NMD, an echo return loss enhancement measure, a voice direction measure, signal and noise estimates, and speech spectral data.

11. The method of claim 9, wherein the sound metadata comprises contextual data, where the contextual data comprises at least one of:
environmental data that describes an environment of the at least one NMD, and
user data that describes a user associated with the at least one NMD.

12. The method of claim 9, wherein the probabilistic model comprises at least one probability density function (PDF) that describes a joint distribution for at least two characteristics from the set of characteristics.

13. The method of claim 9, wherein each annotated speech sample is annotated with at least one of spoken text and speaker characteristics.

14. The method of claim 9, wherein the set of NMD software configuration parameters comprise at least one of a playback volume level, gain level, a noise-reduction parameter, and a wake-word-detection sensitivity parameter.

15. The method of claim 9, wherein performing the acoustic simulation comprises generating a virtual room model based on a given scenario.

16. The method of claim 9, wherein captured sound data cannot be reconstructed from the received sound metadata.

17. A non-transitory computer-readable medium, wherein the non-transitory computer-readable medium is provisioned with program instructions that, when executed by at least one processor, cause a computing system to:
receive a plurality of sets of sound data captured using a plurality of network microphone devices (NMDs), where each of the NMDs is configured in accordance with a set of NMD software configuration parameters;
receive, for each captured set of sound data, sound metadata associated with a respective captured set of sound data, where each piece of sound metadata comprises a set of characteristics for a set of sound data;
generate a probabilistic model based on the received sound metadata;
perform a plurality of acoustic simulations to obtain a noised version of a training data set of annotated speech samples at least in part by:
generating a plurality of scenarios, wherein, for a scenario of the plurality of scenarios:
the scenario comprises a set of characteristics for a set of sound data; and
values for characteristics in the set of characteristics for the scenario are drawn from the probabilistic model; and
for each of the plurality of scenarios, generating a noised version of a specific annotated speech sample by performing an acoustic simulation based upon a specific scenario from the plurality of scenarios;

simulate performance of a set of modified NMD software configuration parameters using the noised version of the training data set of annotated speech samples; and cause software on at least one NMD to be updated based on the set of modified NMD software configuration parameters.

18. The non-transitory computer-readable medium of claim 17, wherein the set of characteristics comprises at least one of frequency response data for individual microphones of a plurality of microphones of the at least one NMD, an echo return loss enhancement measure, a voice direction measure, signal and noise estimates, and speech spectral data.

19. The non-transitory computer-readable medium of claim 17, wherein the sound metadata comprises contextual data, where the contextual data comprises at least one of:
environmental data that describes an environment of the at least one NMD; and
user data that describes a user associated with the at least one NMD.

20. The non-transitory computer-readable medium of claim 17, wherein the probabilistic model comprises at least one probability density function (PDF) that describes a joint distribution for at least two characteristics from the set of characteristics.

21. The non-transitory computer-readable medium of claim 17, wherein each annotated speech sample is annotated with at least one of spoken text and speaker characteristics.

22. The non-transitory computer-readable medium of claim 17, wherein the set of NMD software configuration parameters comprise at least one of a playback volume level, gain level, a noise-reduction parameter, and a wake-word-detection sensitivity parameter.

23. The non-transitory computer-readable medium of claim 17, wherein performing the acoustic simulation comprises generating a virtual room model based on a given scenario.

24. The non-transitory computer-readable medium of claim 17, wherein captured sound data cannot be reconstructed from the received sound metadata.

* * * * *